(12) United States Patent
Aflaki Beni et al.

(10) Patent No.: US 11,430,156 B2
(45) Date of Patent: Aug. 30, 2022

(54) APPARATUS, A METHOD AND A COMPUTER PROGRAM FOR VOLUMETRIC VIDEO

(71) Applicant: Nokia Technologies Oy, Espoo (FI)

(72) Inventors: Payman Aflaki Beni, Tampere (FI); Sebastian Schwarz, Unterhaching (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/755,681

(22) PCT Filed: Aug. 1, 2018

(86) PCT No.: PCT/EP2018/070869
§ 371 (c)(1),
(2) Date: Apr. 13, 2020

(87) PCT Pub. No.: WO2019/076506
PCT Pub. Date: Apr. 25, 2019

(65) Prior Publication Data
US 2021/0192796 A1 Jun. 24, 2021

(30) Foreign Application Priority Data
Oct. 17, 2017 (GB) .................................. 1717011.9

(51) Int. Cl.
*G06T 9/40* (2006.01)
*H04N 13/161* (2018.01)
*H04N 13/388* (2018.01)

(52) U.S. Cl.
CPC ............. *G06T 9/40* (2013.01); *H04N 13/161* (2018.05); *H04N 13/388* (2018.05)

(58) Field of Classification Search
CPC ....... G06T 15/08; G06T 19/006; G06T 15/04; G06T 15/20; G06T 15/205; G06T 17/30; G06T 19/003
See application file for complete search history.

(56) References Cited

U.S. PATENT DOCUMENTS 5,764,237 A * 6/1998 Kaneko .................. G06T 15/04
345/552
7,248,257 B2 7/2007 Elber
(Continued)

FOREIGN PATENT DOCUMENTS

JP 2011228929 A 11/2011
KR 20100095833 A 9/2010
(Continued)

OTHER PUBLICATIONS

Mekuria et al., "Design, Implementation and Evaluation of a Point Cloud Codec for Tele-Immersive Video", IEEE Transactions on Circuits and Systems for Video Technology, vol. 27, No. 4, Apr. 2017, pp. 828-842.
(Continued)

*Primary Examiner* — Peter D Le
(74) *Attorney, Agent, or Firm* — Joseph C. Drish; Harrington & Smith

(57) ABSTRACT

There are disclosed various methods, apparatuses and computer program products for volumetric video encoding and decoding. In some embodiments, projection data generated from a projection geometry of an object in a texture picture of volumetric video data is obtained. One or more property of the projection data is examined to determine whether at least one predetermined condition is fulfilled and if the examining reveals that at least one predetermined condition is fulfilled, at least one compression parameter for the projection data is adapted. The projection data is compressed by using the at least one compression parameter.

17 Claims, 15 Drawing Sheets

(56) References Cited

U.S. PATENT DOCUMENTS

| | | |
|---|---|---|
| 8,126,279 B2 | 2/2012 | Marcellin et al. |
| 9,721,393 B1 | 8/2017 | Dunn et al. |
| 10,509,947 B1* | 12/2019 | Douillard .................. G06T 7/10 |
| 10,699,421 B1* | 6/2020 | Cherevatsky .......... H04N 7/181 |
| 2002/0051491 A1* | 5/2002 | Challapali .............. H04N 19/17 375/240.2 |
| 2002/0118752 A1* | 8/2002 | Oami .................. H04N 19/149 375/240.12 |
| 2003/0012277 A1* | 1/2003 | Azuma ..................... G06T 7/70 375/240.08 |
| 2003/0038798 A1* | 2/2003 | Besl ...................... G06T 15/205 345/420 |
| 2003/0052890 A1* | 3/2003 | Raskar .................. G06T 15/503 345/581 |
| 2003/0151604 A1 | 8/2003 | Kaufman et al. |
| 2003/0214502 A1* | 11/2003 | Park ...................... G06T 17/005 345/420 |
| 2006/0066306 A1* | 3/2006 | Mistretta .......... G01R 33/56308 324/309 |
| 2006/0165174 A1* | 7/2006 | Bernard ................. H04N 19/60 375/240.16 |
| 2006/0229856 A1* | 10/2006 | Burrus ................... G16H 30/40 703/11 |
| 2007/0036418 A1* | 2/2007 | Pan ........................ A61B 6/027 382/131 |
| 2007/0103460 A1* | 5/2007 | Zhang .................... G06T 7/246 345/419 |
| 2007/0139433 A1* | 6/2007 | Anderson ............... G06T 15/50 345/582 |
| 2007/0274588 A1* | 11/2007 | Jeong .................. H04N 9/3194 382/181 |
| 2008/0118143 A1* | 5/2008 | Gordon .................. G06T 7/521 382/154 |
| 2009/0034792 A1* | 2/2009 | Kennison ................. G06T 9/00 382/103 |
| 2009/0060310 A1* | 3/2009 | Li .......................... G06T 11/006 382/132 |
| 2009/0213240 A1* | 8/2009 | Sim ........................ H04N 13/10 348/222.1 |
| 2009/0295800 A1* | 12/2009 | Vetter .................... G06T 15/08 345/424 |
| 2010/0215098 A1 | 8/2010 | Chung |
| 2010/0239178 A1* | 9/2010 | Osher ..................... G06T 9/001 382/243 |
| 2010/0266220 A1* | 10/2010 | Zagorchev ........... A61B 6/5205 382/285 |
| 2010/0328308 A1* | 12/2010 | Gamliel .................. G06T 17/20 345/420 |
| 2011/0075899 A1* | 3/2011 | Kunze .................. G01N 23/046 382/128 |
| 2011/0148875 A1* | 6/2011 | Kim ........................ G06T 13/40 345/420 |
| 2011/0164114 A1* | 7/2011 | Kobayashi ............. G01B 11/25 348/46 |
| 2011/0234630 A1* | 9/2011 | Batman ................. G06F 40/169 345/629 |
| 2012/0033071 A1* | 2/2012 | Kobayashi ............. G01B 11/25 348/139 |
| 2012/0051664 A1* | 3/2012 | Gopalakrishnan ........ G06T 7/20 382/294 |
| 2012/0063678 A1* | 3/2012 | Asikainen .............. H04N 19/93 382/165 |
| 2012/0176381 A1* | 7/2012 | Park ...................... G06T 17/005 345/424 |
| 2012/0268567 A1* | 10/2012 | Nakazato ............... G01B 11/03 348/46 |
| 2012/0321208 A1 | 12/2012 | Uematsu et al. |
| 2013/0076865 A1* | 3/2013 | Tateno ...................... G06T 7/75 348/46 |
| 2014/0118398 A1 | 5/2014 | Hall |
| 2014/0184596 A1* | 7/2014 | Unger .................... G06T 15/04 345/423 |
| 2014/0184631 A1* | 7/2014 | Unger .................... G06T 15/10 345/586 |
| 2014/0226784 A1* | 8/2014 | Meng .................... G01T 1/1644 378/19 |
| 2014/0267260 A1* | 9/2014 | Hakura ................... G09G 5/14 345/423 |
| 2014/0348385 A1* | 11/2014 | Kozicz .................... F16P 3/142 382/103 |
| 2015/0042658 A1* | 2/2015 | Erhard .................... G06T 5/002 345/427 |
| 2015/0085068 A1 | 3/2015 | Becker et al. |
| 2015/0228106 A1* | 8/2015 | Laksono ................ G06T 15/04 345/419 |
| 2016/0217604 A1* | 7/2016 | De Roos .................. G06T 7/70 |
| 2017/0085857 A1 | 3/2017 | Feng |
| 2017/0094262 A1* | 3/2017 | Peterson ............... G06T 19/006 |
| 2017/0310945 A1* | 10/2017 | Juang ................... G06T 19/006 |
| 2018/0374192 A1* | 12/2018 | Kunkel ................. G06T 3/0087 |
| 2019/0141359 A1* | 5/2019 | Taquet ............. H04N 21/21805 |
| 2020/0084428 A1* | 3/2020 | Oh ....................... H04N 21/816 |

FOREIGN PATENT DOCUMENTS

| | | |
|---|---|---|
| WO | 2009/073730 A2 | 6/2009 |
| WO | 2009/073823 A1 | 6/2009 |
| WO | 2014/134828 A1 | 9/2014 |
| WO | 2019/034807 A1 | 2/2019 |
| WO | 2019/034808 A1 | 2/2019 |

OTHER PUBLICATIONS

"Google Draco", GitHub, Retrieved on Mar. 27, 2020, Webpage available at: https://github.com/google/draco.

Mamou et al., "FAMC: The MPEG-4 standard for Animated Mesh Compression", IEEE International Conference on Image Processing, Oct. 12-15, 2008, pp. 2676-2679.

Peng et al., "Acquiring Human Skeleton Proportions from Monocular Images without Posture Estimation", 10th International Conference on Control, Automation, Robotics and Vision, Dec. 17-20, 2008, pp. 2250-2255.

Urunuela et al., "2D Silhouette and 3D Skeletal Models for Human Detection and Tracking", Proceedings of the 17th International Conference on Pattern Recognition, vol. 4, Aug. 26, 2004, 4 pages.

"Call for Proposals for Point Cloud Compression V2", ISO/IEC JTC1/SC29/WG11 MPEG2017/N16763, Apr. 2017, 21 pages.

"Next-generation Video Encoding Techniques for 360 Video and VR", Facebook Engineering, Retrieved on Mar. 27, 2020, Webpage available at: https://engineering.fb.com/virtual-reality/next-generation-video-encoding-techniques-for-360-video-and-vr/.

"Information Technology—Dynamic Adaptive Streaming Over HTTP (Dash)—Part 1: Media Presentation Description and Segment Formats", ISO/IEC 23009-1, May 15, 2014, 152 pages.

Search Report received for corresponding United Kingdom Patent Application No. 1717011.9, dated Apr. 18, 2018, 5 pages.

International Search Report and Written Opinion received for corresponding Patent Cooperation Treaty Application No. PCT/EP2018/070869, dated Nov. 15, 2018, 11 pages.

* cited by examiner

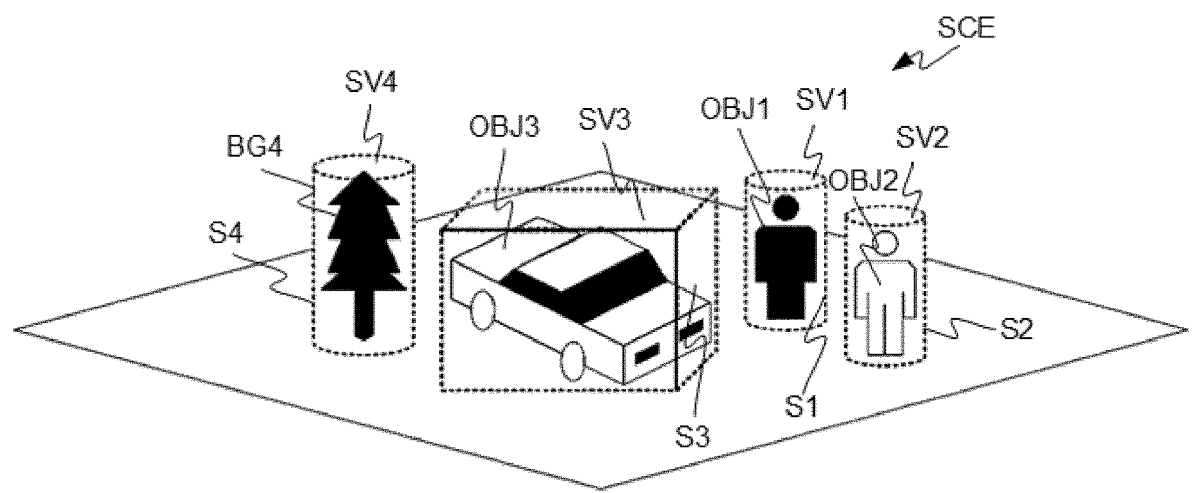
Fig. 5a
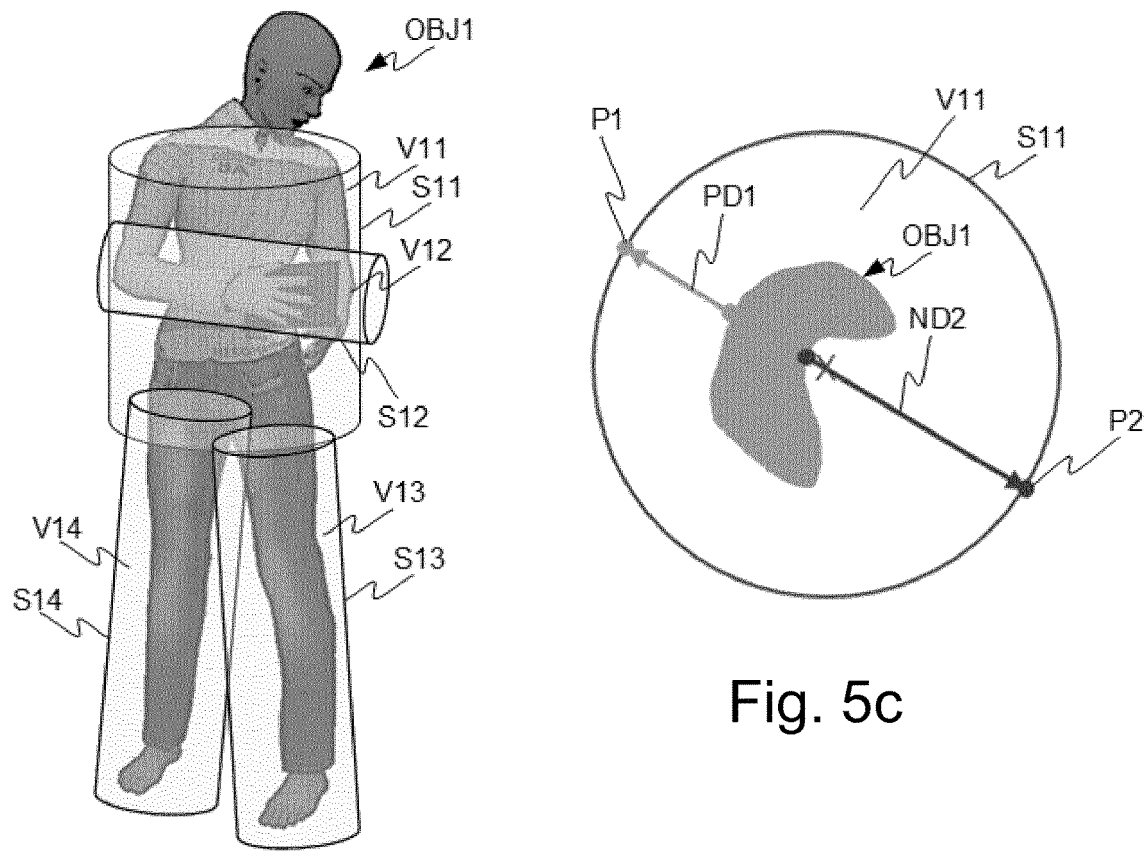
Fig. 5b
Fig. 5c

APPARATUS, A METHOD AND A COMPUTER PROGRAM FOR VOLUMETRIC VIDEO

RELATED APPLICATION

This application claims priority to PCT Application No. PCT/EP2018/070869, filed on Aug. 1, 2018, which claims priority to Great Britain Patent Application No. 1717011.9, filed on Oct. 17, 2017, each of which is incorporated herein by reference in its entirety.

TECHNICAL FIELD

The present invention relates to an apparatus, a method and a computer program for content dependent projection for volumetric video coding and decoding.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

Volumetric video data represents a three-dimensional scene or object and can be used as input for virtual reality (VR), augmented reality (AR) and mixed reality (MR) applications. Such data describes the geometry, e.g. shape, size, position in three-dimensional (3D) space, and respective attributes, e.g. colour, opacity, reflectance and any possible temporal changes of the geometry and attributes at given time instances, comparable to frames in two-dimensional (2D) video. Volumetric video is either generated from 3D models through computer-generated imagery (CGI), or captured from real-world scenes using a variety of capture solutions, e.g. multi-camera, laser scan, combination of video and dedicated depth sensors, and more. Also, a combination of CGI and real-world data is possible.

Typical representation formats for such volumetric data are triangle meshes, point clouds (PCs), or voxel arrays. Temporal information about the scene can be included in the form of individual capture instances, i.e. "frames" in 2D video, or other means, e.g. position of an object as a function of time.

The above mentioned volumetric video representation formats suffer from poor spatial and temporal coding performance.

There is, therefore, a need for solutions for improved coding of volumetric video.

SUMMARY

Now there has been invented an improved method and technical equipment implementing the method, by which the above problems are alleviated. Various aspects of the invention include a method, an apparatus (an encoder and/or a decoder), a system and a computer readable medium comprising a computer program or a signal stored therein, which are characterized by what is stated in the independent claims. Various details of the invention are disclosed in the dependent claims and in the corresponding images and description.

A volumetric video, for example dynamic point clouds, arrays of voxels or mesh models or a combination of such, may be projected onto a number of projection surfaces having simple geometries, for example sphere(s), cylinder(s), cube(s), polyhedron(s) and/or plane(s). In this context, a projection surface may be a piece-wise continuous and smooth surface in three-dimensional space. Piece-wise smoothness may be understood so that there are regions of the surface where the direction of the surface normal does not change abruptly (i.e. the values of the coefficients of the surface normal's coordinate components are continuous). A projection surface may comprise pieces of simple geometric surfaces. A projection surface may also evolve (change) over time. On such surfaces, the texture and geometry of point clouds, voxel arrays or mesh models may form pixel images, e.g. texture images and depth images (indicative of distance from the projection plane). Such projection surfaces may be unfolded onto two-dimensional (2D) planes, e.g. resulting in a two-dimensional pixel image. Standard 2D video coding may be applied for each projection to code the pixel information resulting from the texture data. In connection with the texture information, relevant projection geometry information, comprising e.g. projection or projection surface type, location and orientation of the projection surface in 3D space, and/or size of the projection surface, may be transmitted either in the same bitstream or separately along the bitstream. At the receiver side, the bitstream may be decoded and volumetric video may be reconstructed from decoded 2D projections and projection geometry information.

In an encoding method, a bitstream may be encoded or encapsulated, the bitstream comprising one or more coded texture pictures and one or more coded accompanying additional pictures per texture picture. Each texture picture may represent a 2D projection of 3D data onto a given geometry. Alternatively or in addition, several projections may be frame-packed into a single picture. An additional geometry picture may represent geometry data, e.g. depth. Additional auxiliary pictures may represent further attributes, e.g. surface normal, reflectance and opacity, transmittance and/or refraction of the 3D data. Relevant projection information may be indicated in or along the bitstream. For example, general projection information may be given in or along the bitstream: number of coded texture pictures or frame-packing information. Projection geometry information may be given for the projections: for example comprising shape, size, location and orientation of the projection surfaces. Temporal changes in location, orientation and size of such geometries may be encoded, possibly as function of time. Possible further sub-division of such geometries and resulting changes in geometry information may be given. Nature of auxiliary geometry data may be given: bit depth, quantisation, value range and/or inverse values, that is, coding of negative radius or depth values of the geometry picture. Nature of other auxiliary data, i.e. surface normal, reflectance and opacity, transmittance and/or refraction, etc. may be given.

In a decoding method, a bitstream comprising one or more coded texture picture(s) and one or more coded accompanying geometry pictures and auxiliary pictures per texture picture may be received and decoded. The texture picture represents a two-dimensional projection of three-dimensional data onto a projection surface with a given geometry. A geometry picture may represent geometry data, e.g. depth from the projection surface. Additional auxiliary pictures may represent further attributes, e.g. surface normal, reflectance, opacity, etc. as described earlier. Relevant projection information may also be decoded from or along a bitstream. From this decoded information, a 3D scene may be reconstructed accordingly.

Some embodiments provide a method for encoding and decoding volumetric video information. In some embodiments of the present invention there is provided a method, apparatus and computer program product for volumetric video coding as well as decoding.

Various aspects of examples of the invention are provided in the detailed description.

According to a first aspect, there is provided a method comprising:

obtaining projection data generated from a projection geometry of an object in a texture picture of volumetric video data;

examining one or more property of the projection data to determine whether at least one predetermined condition is fulfilled;

if the examining reveals that at least one predetermined condition is fulfilled, adapting at least one compression parameter for the projection data; and compressing the projection data by using the at least one compression parameter.

An apparatus according to a second aspect comprises at least one processor and at least one memory, said at least one memory stored with code thereon, which when executed by said at least one processor, causes the apparatus to perform at least:

obtain projection data generated from a projection geometry of an object in a texture picture of volumetric video data;

examine one or more property of the projection data to determine whether at least one predetermined condition is fulfilled;

adapt at least one compression parameter for the projection data, if the examining reveals that at least one predetermined condition is fulfilled; and compress the projection data by using the at least one compression parameter.

A computer readable storage medium according to a third aspect comprises code for use by an apparatus, which when executed by a processor, causes the apparatus to perform:

obtain projection data generated from a projection geometry of an object in a texture picture of volumetric video data;

examine one or more property of the projection data to determine whether at least one predetermined condition is fulfilled;

adapt at least one compression parameter for the projection data, if the examining reveals that at least one predetermined condition is fulfilled; and compress the projection data by using the at least one compression parameter.

An apparatus according to a fourth aspect comprises:

means for obtaining projection data generated from a projection geometry of an object in a texture picture of volumetric video data;

means for examining one or more property of the projection data to determine whether at least one predetermined condition is fulfilled;

means for adapting at least one compression parameter for the projection data, if the examining reveals that at least one predetermined condition is fulfilled; and means for compressing the projection data by using the at least one compression parameter.

Further aspects include at least apparatuses and computer program products/code stored on a non-transitory memory medium arranged to carry out the above methods.

BRIEF DESCRIPTION OF THE DRAWINGS

For a more complete understanding of example embodiments of the present invention, reference is now made to the following descriptions taken in connection with the accompanying drawings in which:

FIGS. 5a, 5b and 5c illustrate projection of source volumes in a scene and parts of an object to projection surfaces, as well as determining depth information;

DETAILED DESCRIPTION OF SOME EXAMPLE EMBODIMENTS

Figure 1:
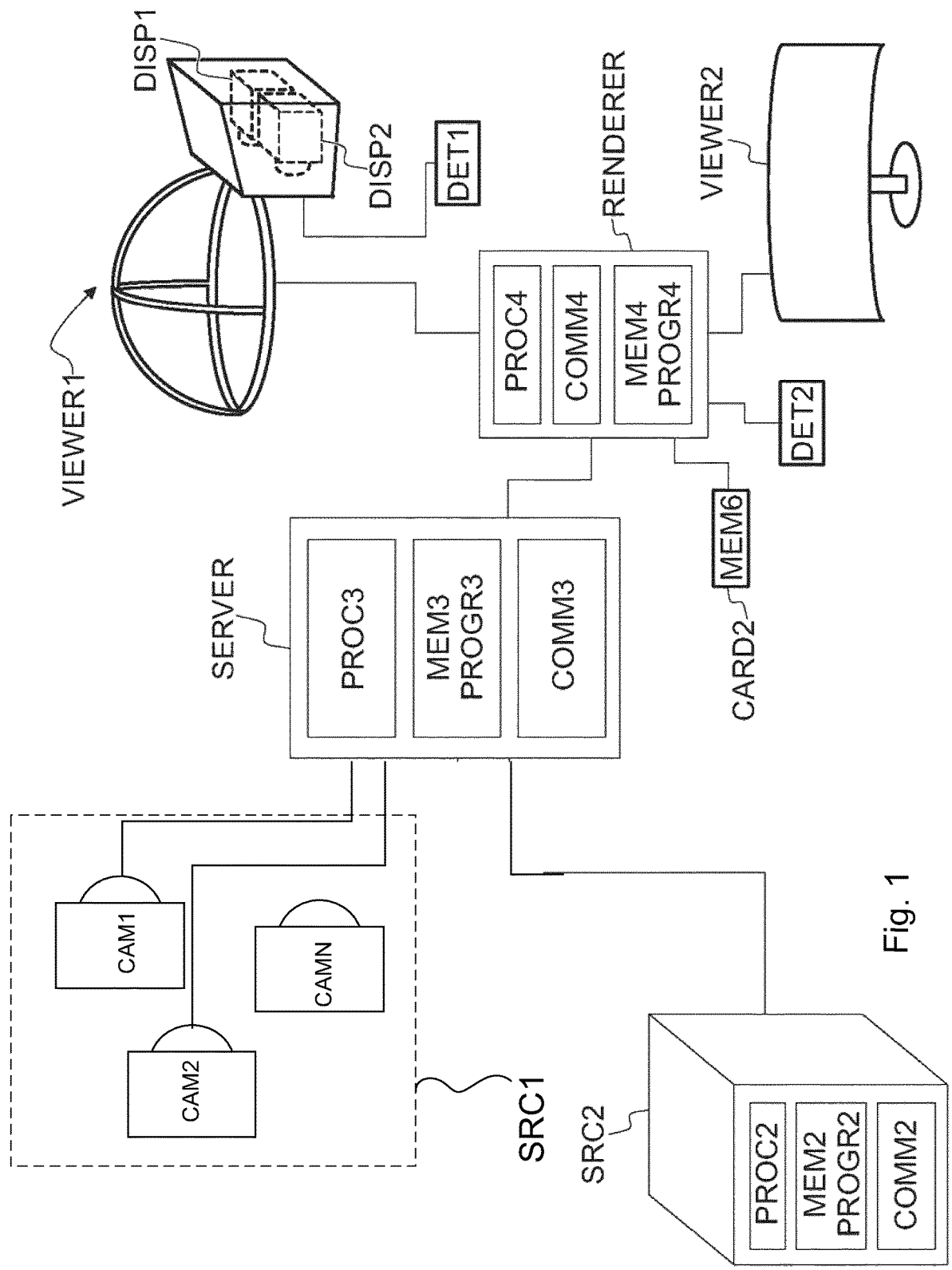
FIG. 1 shows a system for capturing, encoding, decoding, reconstructing and viewing a three-dimensional scheme.

In the following, several embodiments of the invention will be described in the context of point cloud, voxel or mesh scene models for three-dimensional volumetric video and pixel and picture based two-dimensional video coding. It is to be noted, however, that the invention is not limited to specific scene models or specific coding technologies. In fact, the different embodiments have applications in any environment where coding of volumetric scene data is required.

It has been noticed here that identifying correspondences for motion-compensation in three-dimensional space is an ill-defined problem, as both the geometry and the respective attributes of the objects to be coded may change. For example, temporal successive "frames" do not necessarily have the same number of meshes, points or voxel. Therefore, compression of dynamic 3D scenes is inefficient.

"Voxel" of a three-dimensional world corresponds to a pixel of a two-dimensional world. Voxels exist in a three-dimensional grid layout. An octree is a tree data structure used to partition a three-dimensional space. Octrees are the three-dimensional analogue of quadtrees. A sparse voxel octree (SVO) describes a volume of a space containing a set of solid voxels of varying sizes. Empty areas within the volume are absent from the tree, which is why it is called "sparse".

A three-dimensional volumetric representation of a scene is determined as a plurality of voxels on the basis of input streams of at least one multicamera device. Thus, at least one but preferably a plurality (i.e. 2, 3, 4, 5 or more) of multicamera devices are used to capture 3D video representation of a scene. The multicamera devices are distributed in different locations in respect to the scene, and therefore each multicamera device captures a different 3D video representation of the scene. The 3D video representations captured by each multicamera device may be used as input streams for creating a 3D volumetric representation of the scene, said 3D volumetric representation comprising a plurality of voxels. Voxels may be formed from the captured 3D points e.g. by merging the 3D points into voxels comprising a plurality of 3D points such that for a selected 3D point, all neighbouring 3D points within a predefined threshold from the selected 3D point are merged into a voxel without exceeding a maximum number of 3D points in a voxel.

Voxels may also be formed through the construction of the sparse voxel octree. Each leaf of such a tree represents a solid voxel in world space; the root node of the tree represents the bounds of the world. The sparse voxel octree construction may have the following steps: 1) map each input depth map to a world space point cloud, where each pixel of the depth map is mapped to one or more 3D points; 2) determine voxel attributes such as colour and surface normal vector by examining the neighbourhood of the source pixel(s) in the camera images and the depth map; 3) determine the size of the voxel based on the depth value from the depth map and the resolution of the depth map; 4) determine the SVO level for the solid voxel as a function of its size relative to the world bounds; 5) determine the voxel coordinates on that level relative to the world bounds; 6) create new and/or traversing existing SVO nodes until arriving at the determined voxel coordinates; 7) insert the solid voxel as a leaf of the tree, possibly replacing or merging attributes from a previously existing voxel at those coordinates. Nevertheless, the size of voxel within the 3D volumetric representation of the scene may differ from each other. The voxels of the 3D volumetric representation thus represent the spatial locations within the scene.

A volumetric video frame is a complete sparse voxel octree that models the world at a specific point in time in a video sequence. Voxel attributes contain information like colour, opacity, surface normal vectors, and surface material properties. These are referenced in the sparse voxel octrees (e.g. colour of a solid voxel), but can also be stored separately.

Point clouds are commonly used data structures for storing volumetric content. Compared to point clouds, sparse voxel octrees describe a recursive subdivision of a finite volume with solid voxels of varying sizes, while point clouds describe an unorganized set of separate points limited only by the precision of the used coordinate values.

When encoding a volumetric video, each frame may produce several hundred megabytes or several gigabytes of voxel data which needs to be converted to a format that can be streamed to the viewer, and rendered in real-time. The amount of data depends on the world complexity and the number of cameras. The larger impact comes in a multi-device recording setup with a number of separate locations where the cameras are recording. Such a setup produces more information than a camera at a single location.

FIG. 1 shows a system for capturing, encoding, decoding, reconstructing and viewing a three-dimensional scheme, that is, for 3D video and 3D audio digital creation and playback. The task of the system is that of capturing sufficient visual and auditory information from a specific scene to be able to create a scene model such that a convincing reproduction of the experience, or presence, of being in that location can be achieved by one or more viewers physically located in different locations and optionally at a time later in the future. Such reproduction requires more information that can be captured by a single camera or microphone, in order that a viewer can determine the distance and location of objects within the scene using their eyes and their ears. To create a pair of images with disparity, two camera sources are used. In a similar manner, for the human auditory system to be able to sense the direction of sound, at least two microphones are used (the commonly known stereo sound is created by recording two audio channels). The human auditory system can detect the cues, e.g. in timing difference of the audio signals to detect the direction of sound.

The system of FIG. 1 may consist of three main parts: image sources, a server and a rendering device. A video source SRC1 may comprise multiple cameras CAM1, CAM2, . . . , CAMN with overlapping field of view so that regions of the view around the video capture device is captured from at least two cameras. The video source SRC1 may comprise multiple microphones to capture the timing and phase differences of audio originating from different directions. The video source SRC1 may comprise a high-resolution orientation sensor so that the orientation (direction of view) of the plurality of cameras CAM1, CAM2, . . . , CAMN can be detected and recorded. The cameras or the computers may also comprise or be functionally connected to means for forming distance information corresponding to the captured images, for example so that the pixels have corresponding depth data. Such depth data may be formed by scanning the depth or it may be computed from the different images captured by the cameras. The video source SRC1 comprises or is functionally connected to, or each of the plurality of cameras CAM1, CAM2, . . . , CAMN comprises or is functionally connected to a computer processor and memory, the memory comprising computer program code for controlling the source and/or the plurality of cameras. The image stream captured by the video source, i.e. the plurality of the cameras, may be stored on a memory device for use in another device, e.g. a viewer, and/or transmitted to a server using a communication interface. It needs to be understood that although a video source comprising three cameras is described here as part of the system, another amount of camera devices may be used instead as part of the system.

Alternatively or in addition to the source device SRC1 creating information for forming a scene model, one or more sources SRC2 of synthetic imagery may be present in the system, comprising a scene model. Such sources may be used to create and transmit the scene model and its development over time, e.g. instantaneous states of the model. The model can be created or provided by the source SRC1 and/or SRC2, or by the server SERVER. Such sources may also use the model of the scene to compute various video bitstreams for transmission.

One or more two-dimensional video bitstreams may be computed at the server SERVER or a device RENDERER used for rendering, or another device at the receiving end. When such computed video streams are used for viewing, the viewer may see a three-dimensional virtual world as described in the context of FIGS. 4a-4d. The devices SRC1 and SRC2 may comprise or be functionally connected to one or more computer processors (PROC2 shown) and memory (MEM2 shown), the memory comprising computer program (PROGR2 shown) code for controlling the source device SRC1/SRC2. The image stream captured by the device and the scene model may be stored on a memory device for use in another device, e.g. a viewer, or transmitted to a server or the viewer using a communication interface COMM2. There may be a storage, processing and data stream serving network in addition to the capture device SRC1. For example, there may be a server SERVER or a plurality of servers storing the output from the capture device SRC1 or device SRC2 and/or to form a scene model from the data from devices SRC1, SRC2. The device SERVER comprises or is functionally connected to a computer processor PROC3 and memory MEM3, the memory comprising computer program PROGR3 code for controlling the server. The device SERVER may be connected by a wired or wireless network connection, or both, to sources SRC1 and/or SRC2, as well as the viewer devices VIEWER1 and VIEWER2 over the communication interface COMM3.

The creation of a three-dimensional scene model may take place at the server SERVER or another device by using the images captured by the devices SRC1. The scene model may be a model created from captured image data (a real-world model), or a synthetic model such as on device SRC2, or a combination of such. As described later, the scene model may be encoded to reduce its size and transmitted to a decoder, for example viewer devices.

For viewing the captured or created video content, there may be one or more viewer devices VIEWER1 and VIEWER2. These devices may have a rendering module and a display module, or these functionalities may be combined in a single device. The devices may comprise or be functionally connected to a computer processor PROC4 and memory MEM4, the memory comprising computer program PROG4 code for controlling the viewing devices. The viewer (playback) devices may consist of a data stream receiver for receiving a video data stream and for decoding the video data stream. The video data stream may be received from the server SERVER or from some other entity, such as a proxy server, an edge server of a content delivery network, or a file available locally in the viewer device. The data stream may be received over a network connection through communications interface COMM4, or from a memory device MEM6 like a memory card CARD2. The viewer devices may have a graphics processing unit for processing of the data to a suitable format for viewing. The viewer VIEWER1 may comprise a high-resolution stereo-image head-mounted display for viewing the rendered stereo video sequence. The head-mounted display may have an orientation sensor DET1 and stereo audio headphones. The viewer VIEWER2 may comprise a display (either two-dimensional or a display enabled with 3D technology for displaying stereo video), and the rendering device may have an orientation detector DET2 connected to it. Alternatively, the viewer VIEWER2 may comprise a 2D display, since the volumetric video rendering can be done in 2D by rendering the viewpoint from a single eye instead of a stereo eye pair.

It needs to be understood that FIG. 1 depicts one SRC1 device and one SRC2 device, but generally the system may comprise more than one SRC1 device and/or SRC2 device.

Any of the devices (SRC1, SRC2, SERVER, RENDERER, VIEWER1, VIEWER2) may be a computer or a portable computing device, or be connected to such or configured to be connected to such. Moreover, even if the devices (SRC1, SRC2, SERVER, RENDERER, VIEWER1, VIEWER2) are depicted as a single device in FIG. 1, they may comprise multiple parts or may be comprised of multiple connected devices. For example, it needs to be understood that SERVER may comprise several devices, some of which may be used for editing the content produced by SRC1 and/or SRC2 devices, some others for compressing the edited content, and a third set of devices may be used for transmitting the compressed content. Such devices may have computer program code for carrying out methods according to various examples described in this text.

Figure 2A:
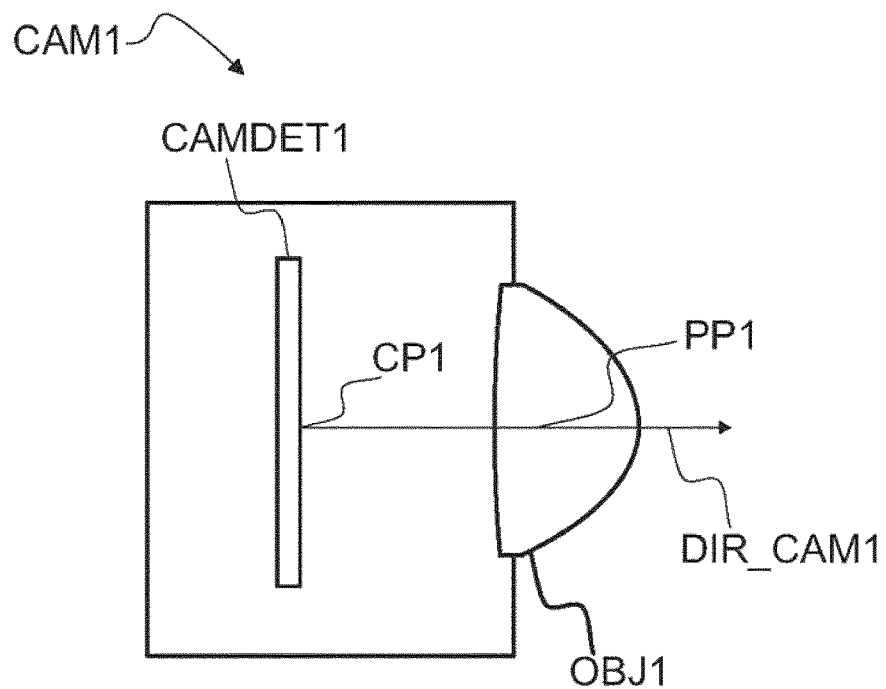
FIGS. 2a and 2b show a capture device and a viewing device.
Figure 2B:
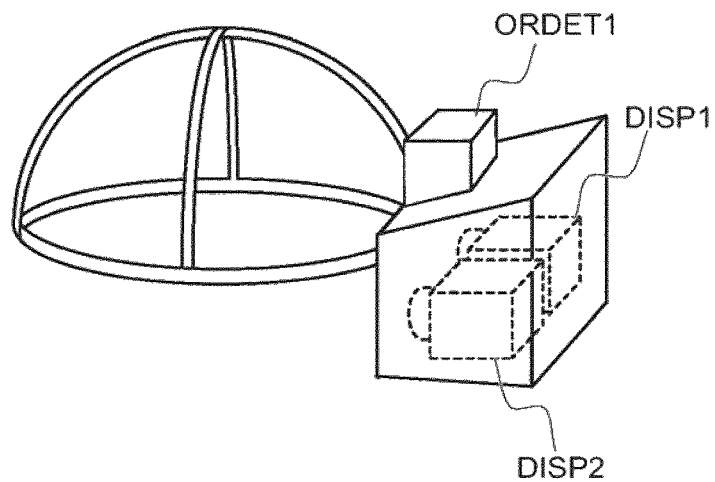

FIGS. 2a and 2b show a capture device and a viewing device, respectively. FIG. 2a illustrates a camera CAM1. The camera has a camera detector CAMDET1, comprising a plurality of sensor elements for sensing intensity of the light hitting the sensor element. The camera has a lens OBJ1 (or a lens arrangement of a plurality of lenses), the lens being positioned so that the light hitting the sensor elements travels through the lens to the sensor elements. The camera detector CAMDET1 has a nominal centre point CP1 that is a middle point of the plurality of sensor elements, for example for a rectangular sensor the crossing point of diagonals of the rectangular sensor. The lens has a nominal centre point PP1, as well, lying for example on the axis of symmetry of the lens. The direction of orientation of the camera is defined by the line passing through the centre point CP1 of the camera sensor and the centre point PP1 of the lens. The direction of the camera is a vector along this line pointing in the direction from the camera sensor to the lens. The optical axis of the camera is understood to be this line CP1-PP1. However, the optical path from the lens to the camera detector need not always be a straight line but there may be mirrors and/or some other elements which may affect the optical path between the lens and the camera detector.

FIG. 2b shows a head-mounted display (HMD) for stereo viewing. The head-mounted display comprises two screen sections or two screens DISP1 and DISP2 for displaying the left and right eye images. The displays are close to the eyes, and therefore lenses are used to make the images easily viewable and for spreading the images to cover as much as possible of the eyes' field of view. When the device will be used by a user, the user may put the device on her/his head so that it will be attached to the head of the user so that it stays in place even when the user turns his head. The device may have an orientation detecting module ORDET1 for determining the head movements and direction of the head. The head-mounted display gives a three-dimensional (3D) perception of the recorded/streamed content to a user.

The system described above may function as follows. Time-synchronized video and orientation data is first recorded with the capture devices. This can consist of multiple concurrent video streams as described above. One or more time-synchronized audio streams may also be recorded with the capture devices. The different capture devices may form image and geometry information of the scene from different directions. For example, there may be three, four, five, six or more cameras capturing the scene from different sides, like front, back, left and right, and/or at directions between these, as well as from the top or bottom, or any combination of these. The cameras may be at different distances, for example some of the cameras may capture the whole scene and some of the cameras may be capturing one or more objects in the scene. In an arrangement used for capturing volumetric video data, several cameras may be directed towards an object, looking onto the object from different directions, where the object is e.g. in the middle of the cameras. In this manner, the texture and geometry of the scene and the objects within the scene may be captured adequately. As mentioned earlier, the cameras or the system may comprise means for determining geometry information, e.g. depth data, related to the captured video streams. From these concurrent video and audio streams, a computer model of a scene may be created. Alternatively or additionally, a synthetic computer model of a virtual scene may be used. The models (at successive time instances) are then transmitted immediately or later to the storage and processing network for processing and conversion into a format suitable for subsequent delivery to playback devices. The conversion may involve processing and coding to improve the quality and/or reduce the quantity of the scene model data while preserving the quality at a desired level. Each playback device receives a stream of the data (either computed video data or scene model data) from the network, and renders it into a viewing reproduction of the original location which can be experienced by a user. The reproduction may be two-dimensional or three-dimensional (stereo image pairs).

Figure 3A:
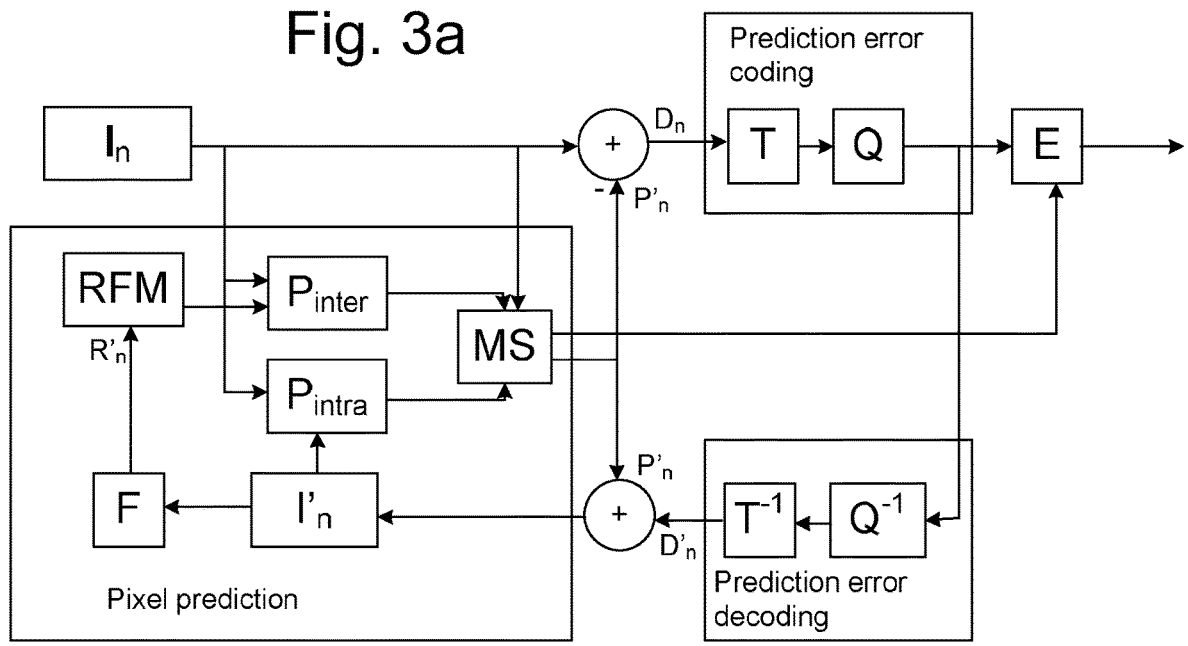
FIGS. 3a and 3b show an encoder and decoder for encoding and decoding texture pictures, geometry pictures and/or auxiliary pictures.
Figure 3B:
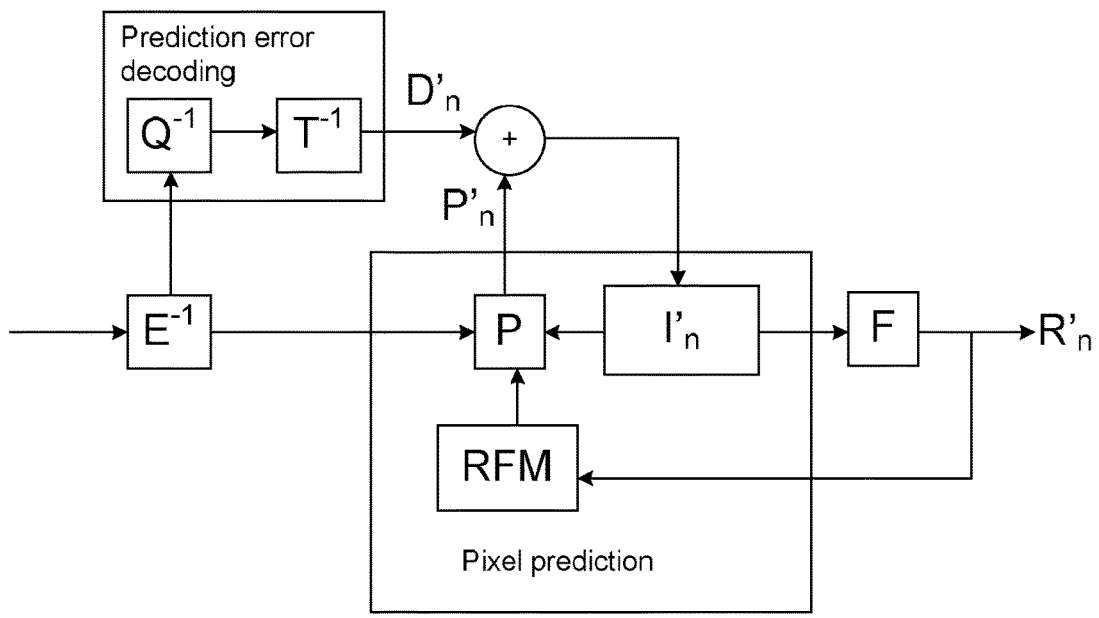

FIGS. 3a and 3b show an encoder and decoder for encoding and decoding texture pictures, geometry pictures and/or auxiliary pictures. A video codec consists of an encoder that transforms an input video into a compressed representation suited for storage/transmission and a decoder that can uncompress the compressed video representation back into a viewable form. Typically, the encoder discards and/or loses some information in the original video sequence in order to represent the video in a more compact form (that is, at lower bitrate). An example of an encoding process is illustrated in FIG. 3a. FIG. 3a illustrates an image to be encoded (I''); a predicted representation of an image block (P'''); a prediction error signal (D''); a reconstructed prediction error signal (D'''); a preliminary reconstructed image (I'''); a final reconstructed image (R'''); a transform (T) and inverse transform ($T^{-1}$); a quantization (Q) and inverse quantization ($Q^{-1}$); entropy encoding (E); a reference frame memory (RFM); inter prediction intra prediction (Pinter); ($P_{intra}$); mode selection (MS) and filtering (F).

An example of a decoding process is illustrated in FIG. 3b. FIG. 3b illustrates a predicted representation of an image block (P'''); a reconstructed prediction error signal (D'''); a preliminary reconstructed image (I'''); a final reconstructed image (R'''); an inverse transform ($T^{-1}$); an inverse quantization ($Q^{-1}$); an entropy decoding ($E^{-1}$); a reference frame memory (RFM); a prediction (either inter or intra) (P); and filtering (F).

Figure 4A:
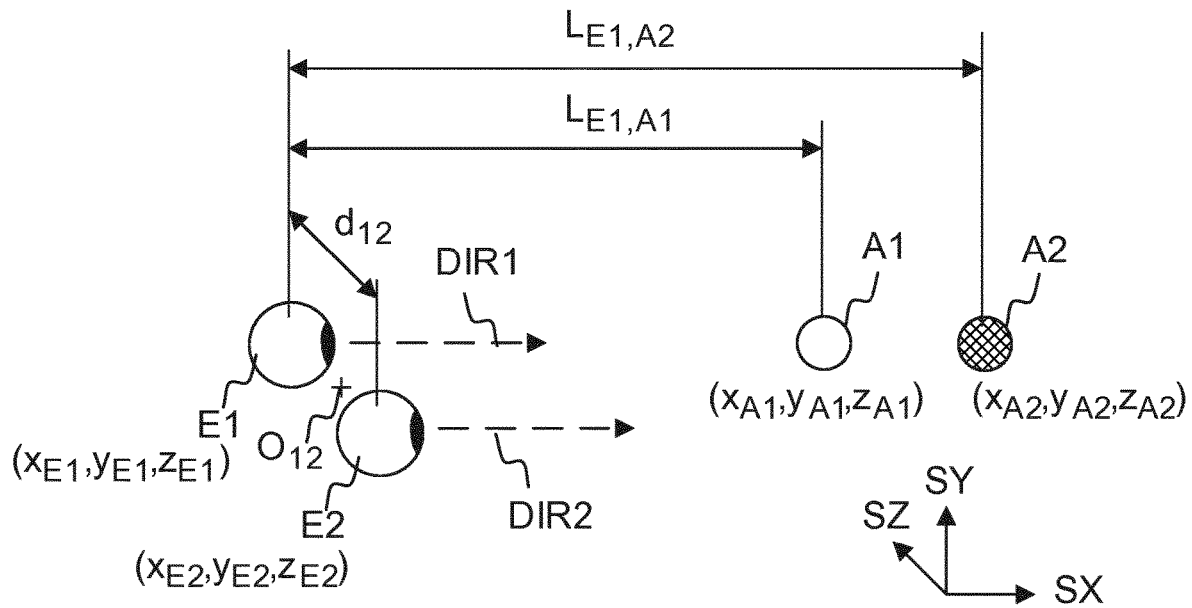
FIGS. 4a, 4b, 4c and 4d show a setup for forming a stereo image of a scene to a user.

FIGS. 4a, 4b, 4c and 4d show a setup for forming a stereo image of a scene to a user, for example a video frame of a 3D video. In FIG. 4a, a situation is shown where a human being is viewing two spheres A1 and A2 using both eyes E1 and E2. The sphere A1 is closer to the viewer than the sphere A2, the respective distances to the first eye E1 being $L_{E1,A1}$ and $L_{E1,A2}$. The different objects reside in space at their respective (x,y,z) coordinates, defined by the coordinate system SZ, SY and SZ. The distance $d_{12}$ between the eyes of a human being may be approximately 62-64 mm on average, and varying from person to person between 55 and 74 mm. This distance is referred to as the parallax, on which stereoscopic view of the human vision is based on. The viewing directions (optical axes) DIR1 and DIR2 are typically essentially parallel, possibly having a small deviation from being parallel, and define the field of view for the eyes. The head of the user has an orientation (head orientation) in relation to the surroundings, most easily defined by the common direction of the eyes when the eyes are looking straight ahead. That is, the head orientation tells the yaw, pitch and roll of the head in respect of a coordinate system of the scene where the user is.

When the viewer's body (thorax) is not moving, the viewer's head orientation is restricted by the normal anatomical ranges of movement of the cervical spine.

In the setup of FIG. 4a, the spheres A1 and A2 are in the field of view of both eyes. The centre-point $O_{12}$ between the eyes and the spheres are on the same line. That is, from the centre-point, the sphere A2 is behind the sphere A1. However, each eye sees part of sphere A2 from behind A1, because the spheres are not on the same line of view from either of the eyes.

Figure 4B:
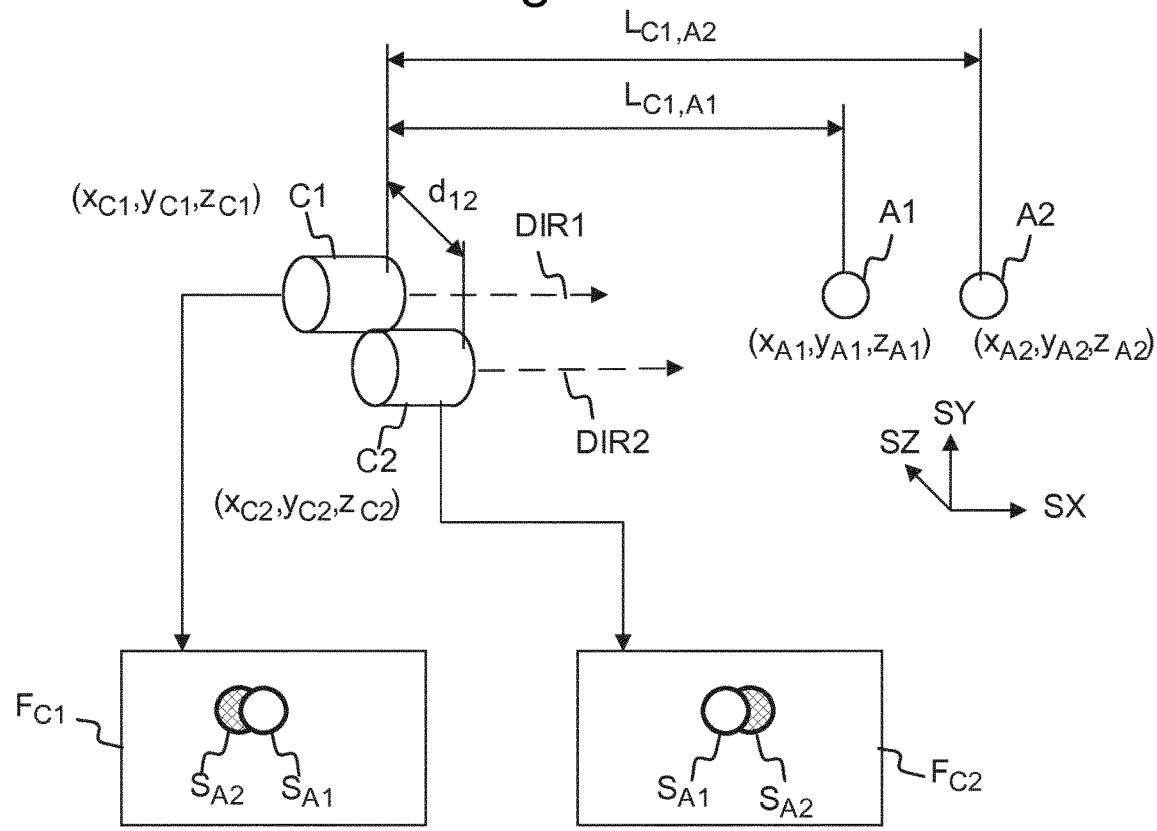

In FIG. 4b, there is a setup shown, where the eyes have been replaced by cameras C1 and C2, positioned at the location where the eyes were in FIG. 4a. The distances and directions of the setup are otherwise the same. Naturally, the purpose of the setup of FIG. 4b is to be able to take a stereo image of the spheres A1 and A2. The two images resulting from image capture are $F_{C1}$, and $F_{C2}$. The "left eye" image $F_{C1}$ shows the image $S_{A2}$ of the sphere A2 partly visible on the left side of the image $S_{A1}$ of the sphere A1. The "right eye" image $F_{C2}$ shows the image $S_{A2}$ of the sphere A2 partly visible on the right side of the image $S_{A1}$ of the sphere A1. This difference between the right and left images is called disparity, and this disparity, being the basic mechanism with which the HVS determines depth information and creates a 3D view of the scene, can be used to create an illusion of a 3D image.

In this setup of FIG. 4b, where the inter-eye distances correspond to those of the eyes in FIG. 4a, the camera pair C1 and C2 has a natural parallax, that is, it has the property of creating natural disparity in the two images of the cameras. Natural disparity may be understood to be created even though the distance between the two cameras forming the stereo camera pair is somewhat smaller or larger than the normal distance (parallax) between the human eyes, e.g. essentially between 40 mm and 100 mm or even 30 mm and 120 mm.

It needs to be understood here that the images $F_{C1}$ and $F_{C2}$ may be captured by cameras C1 and C2, where the cameras C1 and C2 may be real-world cameras or they may be virtual cameras. In the case of virtual cameras, the images $F_{C1}$ and $F_{C2}$ may be computed from a computer model of a scene by setting the direction, orientation and viewport of the cameras C1 and C2 appropriately such that a stereo image pair suitable for viewing by the human visual system (HVS) is created.

Figure 4C:
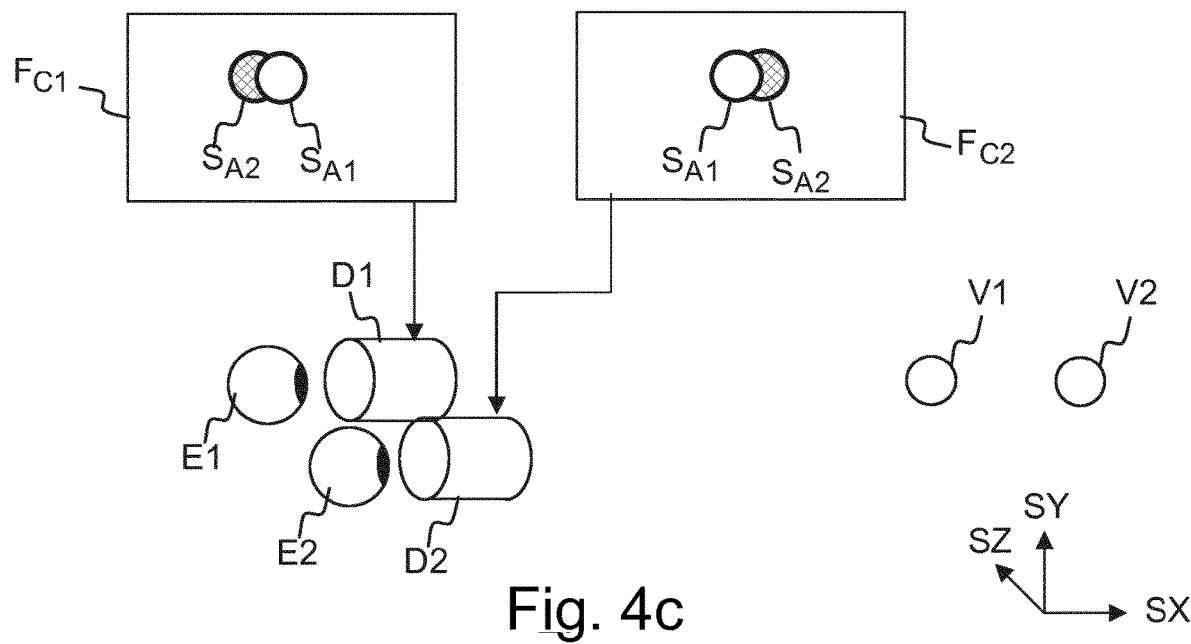

In FIG. 4c, the creating of this 3D illusion is shown. The images $F_{C1}$ and $F_{C2}$ captured or computed by the cameras C1 and C2 are displayed to the eyes E1 and E2, using displays D1 and D2, respectively. The disparity between the images is processed by the human visual system so that an understanding of depth is created. That is, when the left eye sees the image $S_{A2}$ of the sphere A2 on the left side of the image $S_{A1}$ of sphere A1, and respectively the right eye sees the image $S_{A2}$ of the sphere A2 on the right side, the human visual system creates an understanding that there is a sphere V2 behind the sphere V1 in a three-dimensional world. Here, it needs to be understood that the images $F_{C1}$ and $F_{C2}$ can also be synthetic, that is, created by a computer. If they carry the disparity information, synthetic images will also be seen as three-dimensional by the human visual system. That is, a pair of computer-generated images can be formed so that they can be used as a stereo image.

Figure 4D:
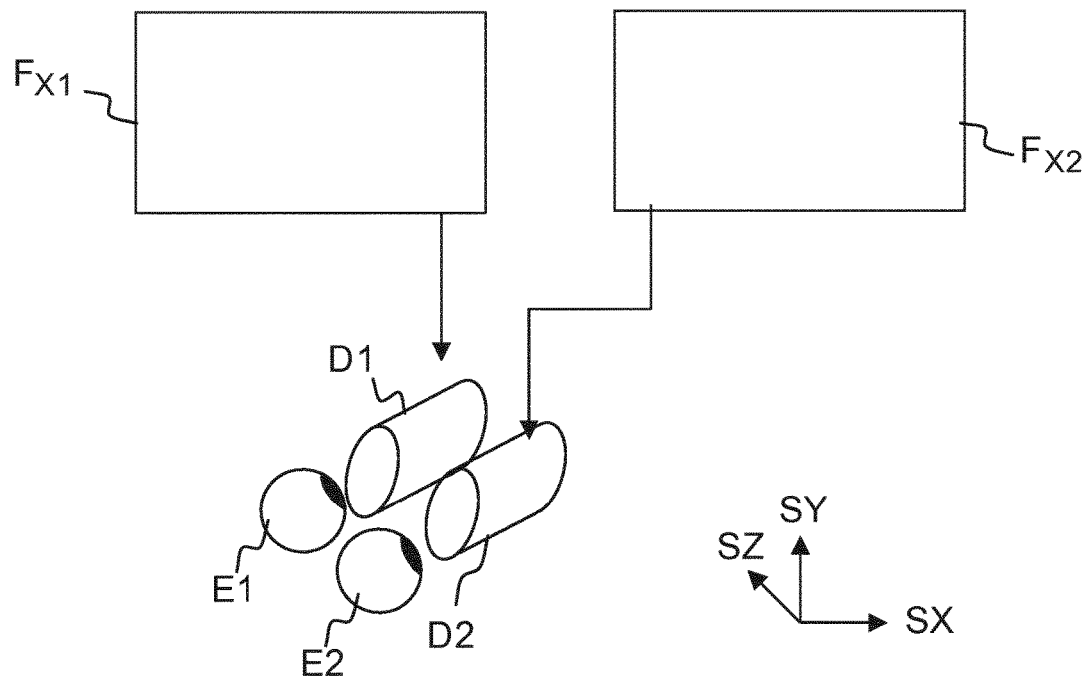

FIG. 4d illustrates how the principle of displaying stereo images to the eyes can be used to create 3D movies or virtual reality scenes having an illusion of being three-dimensional.

The images $F_{X1}$ and $F_{X2}$ are either captured with a stereo camera or computed from a model so that the images have the appropriate disparity. By displaying a large number (e.g. 30) frames per second to both eyes using display D1 and D2 so that the images between the left and the right eye have disparity, the human visual system will create a cognition of a moving, three-dimensional image.

The field of view represented by the content may be greater than the displayed field of view e.g. in an arrangement depicted in FIG. 4d. Consequently, only a part of the content along the direction of view (a.k.a. viewing orientation) is displayed at a single time. This direction of view, that is, the head orientation, may be determined as a real orientation of the head e.g. by an orientation detector mounted on the head, or as a virtual orientation determined by a control device such as a joystick or mouse that can be used to manipulate the direction of view without the user actually moving his head. That is, the term "head orientation" may be used to refer to the actual, physical orientation of the user's head and changes in the same, or it may be used to refer to the virtual direction of the user's view that is determined by a computer program or a computer input device.

The content may enable viewing from several viewing positions within the 3D space. The texture picture(s), the geometry picture(s) and the geometry information may be used to synthesize the images $F_{X1}$ and/or $F_{X2}$ as if the displayed content was captured by camera(s) located at the viewing position.

The principle illustrated in FIGS. 4a-4d may be used to create three-dimensional images to a viewer from a three-dimensional scene model (volumetric video) after the scene model has been encoded at the sender and decoded and reconstructed at the receiver. Because volumetric video describes a 3D scene or object at different (successive) time instances, such data can be viewed from any viewpoint. Therefore, volumetric video is an important format for any augmented reality, virtual reality and mixed reality applications, especially for providing viewing capabilities having six degrees of freedom (so-called 6DOF viewing).

FIGS. 5a, 5b and 5c illustrate projection of source volumes in a digital scene model SCE and parts of an object model OBJ1, OBJ2, OBJ3, BG4 to projection surfaces S1, S2, S3, S4, as well as determining depth information for the purpose of encoding volumetric video.

The projection of source volumes SV1, SV2, SV3, SV4 may result in texture pictures and geometry pictures, and there may be geometry information related to the projection source volumes and/or projection surfaces. Texture pictures, geometry pictures and projection geometry information may be encoded into a bitstream. A texture picture may comprise information on the colour data of the source of the projection. Through the projection, such colour data may result in pixel colour information in the texture picture. Pixels may be coded in groups, e.g. coding units of rectangular shape. The projection geometry information may comprise but is not limited to one or more of the following:
- projection type, such as planar projection or equirectangular projection
- projection surface type, such as a cube
- location of the projection surface in 3D space
- orientation of the projection surface in 3D space
- size of the projection surface in 3D space
- type of a projection centre, such as a projection centre point, axis, or plane
- location and/or orientation of a projection centre.

The projection may take place by projecting the geometry primitives (points of a point could, triangles of a triangle mesh or voxels of a voxel array) of a source volume SV1, SV2, SV3, SV4 (or an object OBJ1, OBJ2, OBJ3, BG4) onto a projection surface S1, S2, S3, S4. The geometry primitives may comprise information on the texture, for example a colour value or values of a point, a triangle or a voxel. The projection surface may surround the source volume at least partially such that projection of the geometry primitives happens from the centre of the projection surface outwards to the surface. For example, a cylindrical surface has a centre axis and a spherical surface has a centre point. A cubical or rectangular surface may have centre planes or a centre axis and the projection of the geometry primitives may take place either orthogonally to the sides of the surface or from the centre axis outwards to the surface. The projection surfaces, e.g. cylindrical and rectangular, may be open from the top and the bottom such that when the surface is cut and rolled out on a two-dimensional plane, it forms a rectangular shape. Such rectangular shape with pixel data can be encoded and decoded with a video codec.

Alternatively or in addition, the projection surface such as a planar surface or a sphere may be inside group of geometry primitives, e.g. inside a point cloud that defines a surface. In the case of an inside projection surface, the projection may take place from outside in towards the centre and may result in sub-sampling of the texture data of the source.

In a point cloud based scene model or object model, points may be represented with any floating point coordinates. A quantized point cloud may be used to reduce the amount of data, whereby the coordinate values of the point cloud are represented e.g. with 10-bit, 12-bit or 16-bit integers. Integers may be used because hardware accelerators may be able to operate on integers more efficiently. The points in the point cloud may have associated colour, reflectance, opacity etc. texture values. The points in the point cloud may also have a size, or a size may be the same for all points. The size of the points may be understood as indicating how large an object the point appears to be in the model in the projection. The point cloud is projected by ray casting from the projection surface to find out the pixel values of the projection surface. In such a manner, the topmost point remains visible in the projection, while points closer to the centre of the projection surface may be occluded. In other words, in general, the original point cloud, meshes, voxels, or any other model is projected outwards to a simple geometrical shape, this simple geometrical shape being the projection surface.

Different projection surfaces may have different characteristics in terms of projection and reconstruction. In the sense of computational complexity, a projection to a cubical surface may be the most efficient, and a cylindrical projection surface may provide accurate results efficiently. Also cones, polyhedron-based parallelepipeds (hexagonal or octagonal, for example) and spheres or a simple plane may be used as projection surfaces.

The phrase along the bitstream (e.g. indicating along the bitstream) may be defined to refer to out-of-band transmission, signalling, or storage in a manner that the out-of-band data is associated with the bitstream. The phrase decoding along the bitstream or alike may refer to decoding the referred out-of-band data (which may be obtained from out-of-band transmission, signalling, or storage) that is associated with the bitstream. For example, an indication along the bitstream may refer to metadata in a container file that encapsulates the bitstream.

As illustrated in FIG. 5a, a first texture picture may be encoded into a bitstream, and the first texture picture may comprise a first projection of texture data of a first source volume SV1 of a scene model SCE onto a first projection surface S1. The scene model SCE may comprise a number of further source volumes SV2, SV3, SV4.

In the projection, data on the position of the originating geometry primitive may also be determined, and based on this determination, a geometry picture may be formed. This may happen for example so that depth data is determined for each or some of the texture pixels of the texture picture. Depth data is formed such that the distance from the originating geometry primitive such as a point to the projection surface is determined for the pixels. Such depth data may be represented as a depth picture, and similarly to the texture picture, such geometry picture (in this example, depth picture) may be encoded and decoded with a video codec. This first geometry picture may be seen to represent a mapping of the first projection surface to the first source volume, and the decoder may use this information to determine the location of geometry primitives in the model to be reconstructed. In order to determine the position of the first source volume and/or the first projection surface and/or the first projection in the scene model, there may be first geometry information encoded into or along the bitstream.

A picture may be defined to be either a frame or a field. A frame may be defined to comprise a matrix of luma samples and possibly the corresponding chroma samples. A field may be defined to be a set of alternate sample rows of a frame. Fields may be used as encoder input for example when the source signal is interlaced. Chroma sample arrays may be absent (and hence monochrome sampling may be in use) or may be subsampled when compared to luma sample arrays. Some chroma formats may be summarized as follows:

In monochrome sampling there is only one sample array, which may be nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling when no separate colour planes are in use, each of the two chroma arrays has the same height and width as the luma array.

It is possible to code sample arrays as separate colour planes into the bitstream and respectively decode separately coded colour planes from the bitstream. When separate colour planes are in use, each one of them is separately processed (by the encoder and/or the decoder) as a picture with monochrome sampling.

Texture picture(s) and the respective geometry picture(s) may have the same or different chroma format.

Depending on the context, a pixel may be defined to a be a sample of one of the sample arrays of the picture or may be defined to comprise the collocated samples of all the sample arrays of the picture.

Multiple source volumes (objects) may be encoded as texture pictures, geometry pictures and projection geometry information into the bitstream in a similar manner. That is, as in FIG. 5a, the scene model SCE may comprise multiple objects OBJ1, OBJ2, OBJ3, OBJ4, and these may be treated as source volumes SV1, SV2, SV3, SV4 and each object may be coded as a texture picture, geometry picture and projection geometry information. As shown in FIG. 5b, a single object may be composed of different parts and thus different source volumes V11, V12, V13, V14 and corresponding projection surfaces S11, S12, S13, S14 may be used for these different parts.

In the above, the first texture picture of the first source volume SV1 and further texture pictures of the other source volumes SV2, SV3, SV4 may represent the same time instance. That is, there may be a plurality of texture and geometry pictures and projection geometry information for one time instance, and the other time instances may be coded in a similar manner. Since the various source volumes are in this way producing sequences of texture pictures and sequences of geometry pictures, as well as sequences of projection geometry information, the inter-picture redundancy in the picture sequences can be used to encode the texture and geometry data for the source volumes efficiently, compared to the presently known ways of encoding volume data.

An object BG4 (source volume SV4) may be projected onto a projection surface S4 and encoded into the bitstream as a texture picture, geometry picture and projection geometry information as described above. Furthermore, such source volume may be indicated to be static by encoding information into said bitstream on said fourth projection geometry being static. A static source volume or object may be understood to be an object whose position with respect to the scene model remains the same over two or more or all time instances of the video sequence. For such static source volume, the geometry data (geometry pictures) may also stay the same, that is, the object's shape remains the same over two or more time instances. For such static source volume, some or all of the texture data (texture pictures) may stay the same over two or more time instances. By encoding information into the bitstream of the static nature of the source volume the encoding efficiency may further be improved, as the same information may not need to be coded multiple times. In this manner, the decoder will also be able to use the same reconstruction or partially same reconstruction of the source volume (object) over multiple time instances.

In an analogous manner, the different source volumes may be coded into the bitstream with different frame rates. For example, a slow-moving or relatively unchanging object (source volume) may be encoded with a first frame rate, and a fast-moving and/or changing object (source volume) may be coded with a second frame rate. The first frame rate may be slower than the second frame rate, for example one half or one quarter of the second frame rate, or even slower. For example, if the second frame rate is 30 frames per second, the second frame rate may be 15 frames per second, or 1 frame per second. The first and second object (source volumes) may be "sampled" in synchrony such that some frames of the faster frame rate coincide with frames of the slower frame rate.

There may be one or more coordinate systems in the scene model. The scene model may have a coordinate system and one or more of the objects (source volumes) in the scene model may have their local coordinate systems. The shape, size, location and orientation of one or more projection surfaces may be encoded into or along the bitstream with respect to the scene model coordinates. Alternatively or in addition, the encoding may be done with respect to coordinates of the scene model or said first source volume. The choice of coordinate systems may improve the coding efficiency.

Information on temporal changes in location, orientation and size of one or more said projection surfaces may be encoded into or along the bitstream. For example, if one or more of the objects (source volumes) being encoded is moving or rotating with respect to the scene model, the projection surface moves or rotates with the object to preserve the projection as similar as possible.

If the projection volumes are changing, for example splitting or bending into two parts, the projection surfaces may be sub-divided respectively. Therefore, information on sub-division of one or more of the source volumes and respective changes in one or more of the projection surfaces may be encoded into or along the bitstream.

The resulting bitstream may then be output to be stored or transmitted for later decoding and reconstruction of the scene model.

Decoding of the information from the bitstream may happen in analogous manner. A first texture picture may be decoded from a bitstream to obtain first decoded texture data, where the first texture picture comprises a first projection of texture data of a first source volume of the scene model to be reconstructed onto a first projection surface. The scene model may comprise a number of further source volumes. Then, a first geometry picture may be decoded from the bitstream to obtain first decoded scene model geometry data. The first geometry picture may represent a mapping of the first projection surface to the first source volume. First projection geometry information of the first projection may be decoded from the bitstream, the first projection geometry information comprising information of position of the first projection surface in the scene model. Using this information, a reconstructed scene model may be formed by projecting the first decoded texture data to a first destination volume using the first decoded scene model geometry data and said first projection geometry information to determine where the decoded texture information is to be placed in the scene model.

A 3D scene model may be classified into two parts: first all dynamic parts, and second all static parts. The dynamic part of the 3D scene model may further be sub-divided into separate parts, each representing objects (or parts of) an object in the scene model, that is, source volumes. The static parts of the scene model may include e.g. static room geometry (walls, ceiling, fixed furniture) and may be compressed either by known volumetric data compression solutions, or, similar to the dynamic part, sub-divided into individual objects for projection-based compression as described earlier, to be encoded into the bitstream.

In an example, some objects may be a chair (static), a television screen (static geometry, dynamic texture), a moving person (dynamic). For each object, a suitable projection geometry (surface) may be found, e.g. cube projection to represent the chair, another cube for the screen, a cylinder for the person's torso, a sphere for a detailed representation of the person's head, and so on. The 3D data of each object may then be projected onto the respective projection surface and 2D planes are derived by "unfolding" the projections from three dimensions to two dimensions (plane). The unfolded planes will have several channels, typically three for the colour representation of the texture, e.g. RGB, YUV, and one additional plane for the geometry (depth) of each projected point for later reconstruction.

Frame packing may be defined to comprise arranging more than one input picture, which may be referred to as (input) constituent frames, into an output picture. In general, frame packing is not limited to any particular type of constituent frames or the constituent frames need not have a particular relation with each other. In many cases, frame packing is used for arranging constituent frames of a stereoscopic video clip into a single picture sequence. The arranging may include placing the input pictures in spatially non-overlapping areas within the output picture. For example, in a side-by-side arrangement, two input pictures are placed within an output picture horizontally adjacently to each other. The arranging may also include partitioning of one or more input pictures into two or more constituent frame partitions and placing the constituent frame partitions in spatially non-overlapping areas within the output picture. The output picture or a sequence of frame-packed output pictures may be encoded into a bitstream e.g. by a video encoder. The bitstream may be decoded e.g. by a video decoder. The decoder or a post-processing operation after decoding may extract the decoded constituent frames from the decoded picture(s) e.g. for displaying.

A standard 2D video encoder may then receive the planes as inputs, either as individual layers per object, or as a frame-packed representation of all objects. The texture picture may thus comprise a plurality of projections of texture data from further source volumes and the geometry picture may represent a plurality of mappings of projection surfaces to the source volume.

For each object, additional information may be signalled to allow for reconstruction at the decoder side:
- in the case of a frame-packed representation: separation boundaries may be signalled to recreate the individual planes for each object,
- in the case of projection-based compression of static content: classification of each object as static/dynamic may be signalled,
- relevant data to create real-world geometry data from the decoded (quantised) geometry channel(s), e.g. quantisation method, depth ranges, bit depth, etc. may be signalled,
- initial state of each object: geometry shape, location, orientation, size may be signalled,
- temporal changes for each object, either as changes to the initial state on a per-picture level, or as a function of time may be signalled, and
- nature of any additional auxiliary data may be signalled.

For the described example above, signalling may, for example, be as follows:

```
NUM_OBJECTS          4                    // folding-chair, TV, person body, person head
FRAME_PACKED         0                    // individual inputs
for i=0:NUM_OBJECTS                       // initial states for each projection
   PROJ_GEO                               // geometry, e.g. 0: cube, 1: cylinder, 2: sphere, ...
   PROJ_CENTRE_X/Y/Z                      // projection centre in real world coordinates
   PROJ_SIZE_X/Y/Z                        // projection dimensions in real world units
   PROJ_ROTATION_X/Y/Z                    // projection orientation
   PROJ_STATUS                            // 0: dynamic 1:static
   DEPTH_QUANT                            // depth quantisation, i.e. 0 for linear, ...
   DEPTH_MIN                              // minimum depth in real world units
   DEPTH_MAX                              // maximum depth in real world units
end
```

```
for n=0:NUM_FRAMES
   for i=0:NUM_OBJECTS
      CHANGE 1           // i.e. 0=static, 1=translation, 2=trans+rotation, ...
      TRANS_VEC          // translation vector
      ...                // relevant data to represent change
   end
end
```

The decoder may receive the static 3D scene model data together with the video bitstreams representing the dynamic parts of the scene model. Based on the signalled information on the projection geometries, each object may be reconstructed in 3D space and the decoded scene model is created by fusing all reconstructed parts (objects or source volumes) together.

Standard video encoding hardware may be utilized for real-time compression/decompression of the projection surfaces that have been unfolded onto planes.

Simple objects might suffice to be projected and coded with a single projection. Complex objects or larger scene models may require several (different) projections. The projection geometry may remain constant over a volumetric video sequence, but the location and orientation of the projection surfaces in space can change (and can be possibly predicted in the encoding, wherein the difference from the prediction is encoded).

Depth may be coded "outside-in" (indicating the distance from the projection surface to the coded point), or "inside-out" (indicating the distance from the projection centre point or axis to the coded point). In inside-out coding, depth of each projected point may be positive (with positive distance PD1) or negative (with negative distance ND2). As shown in FIG. 5c, the centre of projection cylinder or sphere may fall outside of the 3D object OBJ1, especially when the object is concave. In this case, two surfaces may be projected on one side of the cylinder (P1), so the inner surface is occluded by the outer surface. However, the other side of the cylinder projection is empty and the inner content may be projected onto the other side of the cylinder (P2). As a result, more content of the 3D object may be mapped to the cylinder projection, using negative depth information ND2. Therefore, in the projection with negative depth ND2, there may be projected information in places where there otherwise would not be. This may enable the object to be reconstructed better.

A negative depth projection may be described in the following steps:
  project all points onto a projection surface, e.g. cylinder,
  position the "unfolded" cylinder onto image plane,
  check for each x,y position of image plane if it has multiple points of the source volume assigned to it or alternatively compare radius of a point to its neighbouring points neighbourhood to see if point is part of the same surface,
  keep the point with the largest radius,
  try to write the point with the smallest radius to the "opposite" side (180 degree shift), only if there is no point already mapped onto the opposite side.

Figure 6:
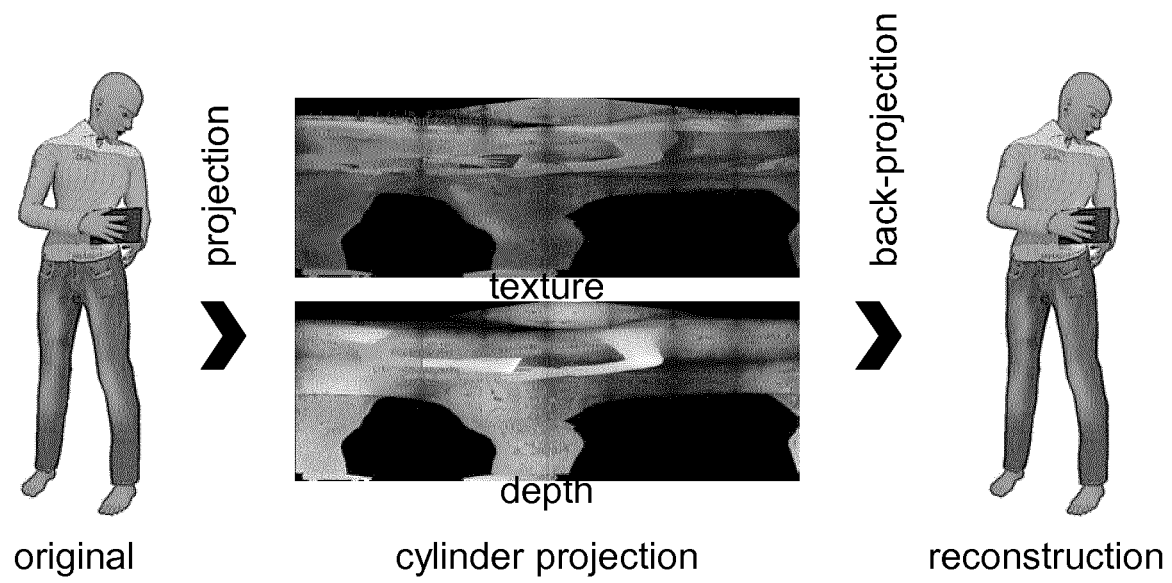
FIG. 6 shows a projection of a source volume to a projection surface, and inpainting of a sparse projection.

FIG. 6 shows a projection of a source volume to a projection surface, and inpainting of a sparse projection. A three-dimensional (3D) scene model, represented as objects OBJ1 comprising geometry primitives such as mesh elements, points, and/or voxel, may be projected onto one, or more, projection surfaces, as described earlier. As shown in FIG. 6, these projection surface geometries may be "unfolded" onto 2D planes (two planes per projected source volume: one for texture TP1, one for depth GPI), which may then be encoded using standard 2D video compression technologies. Relevant projection geometry information may be transmitted alongside the encoded video files to the decoder. The decoder may then decode the video and performs the inverse projection to regenerate the 3D scene model object ROBJ1 in any desired representation format, which may be different from the starting format e.g. reconstructing a point cloud from original mesh model data.

In addition to the texture picture and geometry picture shown in FIG. 6, one or more auxiliary pictures related to one or more said texture pictures and the pixels thereof may be encoded into or along the bitstream. The auxiliary pictures may e.g. represent texture surface properties related to one or more of the source volumes. Such texture surface properties may be e.g. surface normal information (e.g. with respect to the projection direction), reflectance and opacity (e.g. an alpha channel value). An encoder may encode, in or along the bitstream, indication(s) of the type(s) of texture surface properties represented by the auxiliary pictures, and a decoder may decode, from or along the bitstream, indication(s) of the type(s) of texture surface properties represented by the auxiliary pictures.

Mechanisms to represent an auxiliary picture may include but are not limited to the following:
  A colour component sample array, such as a chroma sample array, of the geometry picture.
  An additional sample array in addition to the conventional three colour component sample arrays of the texture picture or the geometry picture.
  A constituent frame of a frame-packed picture that may also comprise texture picture(s) and/or geometry picture(s).
  An auxiliary picture included in specific data units in the bitstream. For example, the Advanced Video Coding (H.264/AVC) standard specifies a network abstraction layer (NAL) unit for a coded slice of an auxiliary coded picture without partitioning.
  An auxiliary picture layer within a layered bitstream. For example, the High Efficiency Video Coding (HEVC) standard comprises the feature of including auxiliary picture layers in the bitstream. An auxiliary picture layer comprises auxiliary pictures.
  An auxiliary picture bitstream separate from the bitstream(s) for the texture picture(s) and geometry picture(s). The auxiliary picture bitstream may be indicated, for example in a container file, to be associated with the bitstream(s) for the texture pictures(s) and geometry picture(s).

The mechanism(s) to be used for auxiliary pictures may be pre-defined e.g. in a coding standard, or the mechanism(s) may be selected e.g. by an encoder and indicated in or along the bitstream. The decoder may decode the mechanism(s) used for auxiliary pictures from or along the bitstream.

The projection surface of a source volume may encompass the source volume, and there may be a model of an object in that source volume. Encompassing may be understood so that the object (model) is inside the surface such that when looking from the centre axis or centre point of the surface, the object's points are closer to the centre than the points of the projection surface are. The model may be made of geometry primitives, as described. The geometry primitives of the model may be projected onto the projection surface to obtain projected pixels of the texture picture. This projection may happen from inside-out. Alternatively or in addition, the projection may happen from outside-in.

Projecting 3D data onto 2D planes is independent from the 3D scene model representation format. There exist several approaches for projecting 3D data onto 2D planes, with the respective signalling. For example, there exist several mappings from spherical coordinates to planar coordinates, known from map projections of the globe, and the type and parameters of such projection may be signalled. For cylindrical projections, the aspect ratio of height and width may be signalled.

Figure 7A:
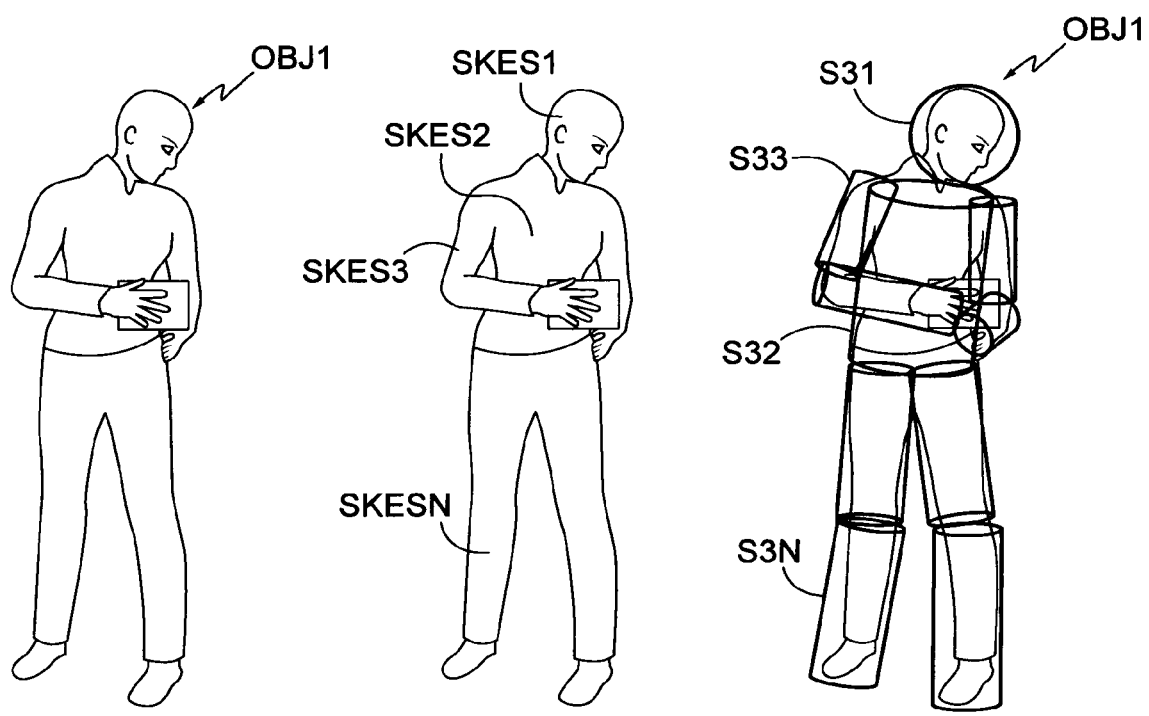
FIGS. 7a, 7b and 7c show examples of skeleton geometry projection.

FIG. 7a shows a skeleton geometry projection.

For the described example, signalling may be as follows:

```
for i=0:NUM_OBJECTS
    ...                         // previous geometry signalling for
overall geometry
    SEGMENTATION 2              // 0: no segmentation, 1: along X-axis,
2: Y-axis, 3: Z-axis
    SEG_NUM                     // number of segments
    SEG_STEP                    // segmentation step, e.g. 8 pixel
for CU alignment
    SEG_CENTRE_X/Y_P0           // n parameters of polynomial
function describing centre changes
    ...
    SEG_CENTRE_X/Y_PN
end
```

In the following, exemplary phases and properties of segmented projection encoding for a point cloud are given:
1. Divide point cloud along primary axis (longest axis) into smaller "subclouds"
2. Each subcloud may have an individual centre for cylinder projection
   Centre coordinates can be encoded as polynomial function
   Further subdivision of the segments may be carried out
   Cylinder height may be aligned with coding unit height of the picture to be encoded,
   Cylinder radius may affect quality & filesize (rate distortion decision may be applied here to find the optimal cylinder radius)
3. Project cylinders individually
   Occlusion detection (only keep outmost points)
   "negative radius": try to project occluded points at the opposite side
4. Form individual single frames for texture and depth
5. Interpolate missing values
6. Optional: Repeat 1-5 along different axis to cover occlusions
7. Encode texture and depth information In an embodiment, a skeletal volumetric video object is represented by several projection geometries. A skeletal volumetric video object may be understood as a volumetric video object (point cloud, meshes, voxel), that can be approximated by an underlying skeleton model. A skeleton model can be understood to be a structure of interconnected segments that lies essentially centrally inside an object's outer surface in the respective parts. In such projection embodiment, different parts of the same object are presented with different cylinders. Similar approach can be used for any other type of other objects which follow a general structural skeleton e.g. an animal, a bird, an aeroplane. Typically, such objects comprise humans and animals. Such models may either be predefined or derived from the original object by analysis tools. Projection geometry subdivision and parameters are then derived from this skeletal model. Skeletal projection surfaces for an object may be understood as a predefined collection of connected simple shapes, where the simple shapes can move/rotate in relation to each other. The simple shapes can have centre axes, and these centre axes can be the described interconnected segments. For example, a cylindrical projection surface may have a centre axis (the skeleton segment) that has the height of the cylinder. This skeleton segment therefore defines the cut point/line, that is, in this case the height, of the projection surface. Two projection surfaces may be defined by interconnected skeletal segments being the centre axes of the surfaces.

There exist several solutions to derive a simplified underlying skeleton from images (with or without depth information), for example: acquiring human skeleton proportions from monocular images without posture estimation, or using 2D silhouette and 3D skeletal models for human shape detection and tracking. A best matching skeleton may be chosen among a number of different skeletons.

As shown in FIG. 7a, such a skeleton can be taken as the starting point to separate a volumetric video object OBJ1 into sub-geometries (projection surfaces) for projection, e.g. a sphere S31 for the head, cylinder for torso S32, two cylinders (e.g. S33, S3N) per arm and leg. The centre points or centre axes of the surfaces may be given by the skeleton parts SKES1, SKES2, SKES3, SKES, respectively (a centre point may be considered as a zero-length centre axis). As the anatomy of a human or animal object typically does not change during the video sequence (except in some extreme genres), these geometries may remain constant over the video sequence and only the change of position and orientation may need to be signalled.

A simple skeleton-based object with at least two parts could be described as follows (naturally, skeletons may comprise more than two parts): a first projection surface S31 and a second projection surface S32 have first and second centre axes SKES1, SKES2, said first and second centre axes defining an extent of said first and second projection surfaces respectively, and the first and second centre axes are connected to each other at one end in a skeleton structure, and the first and second source volumes are adjacent to each other. As is clear, the volumes and surfaces may be partially overlapping at the end regions where the parts are connected to each other, or there may be no overlap.

Information on sub-division of one or more source volumes and respective changes in one or more projection surfaces may be encoded into or along the bitstream. This may be done with respect to the skeleton model, that is, positions of the parts of the skeleton model may be encoded into or along the bitstream.

For the described example, signalling could look like this:

```
for i=0:NUM_OBJECTS
    ...                         // previous geometry signalling for
overall geometry
    SKELETON 1                  // 0: off, 1: on
    MODEL_PARA0...N             // skeleton model parameters
end
```

Sub-division may improve the coverage of the volumetric video object. As anatomy typically does not change, these geometries may remain constant over the video sequence and only change position and orientation, where (both may be easily signalled). As the skeleton may remain fairly fixed in topology sense, encoding of the volumetric video object may become efficient. This method may efficiently divide a volumetric video object into sub-geometries for projection-based volumetric video compression.

In accordance with an approach, the decision on projection geometries is extended by additional information, either derived from the 3D object/scene itself, and/or from specific expectations (or restrictions) for the rendering of such a scene. Furthermore, certain 3D object/scene information is used to derive encoding parameters for the 2D video encoding.

Moreover, each object in the 3D scene presentation is projected based on its skeleton where different parts of the skeleton are projected to different volumetric shapes e.g. cylinders. Each cylinder has its own size/orientation. Considering different criterial on each cylinder, the compression of the content of one cylinder may differ from other cylinders. In the following, some possible criteria for determining which kind of compression to use are listed. However, the list is not exhaustive but also other criteria may be applicable as well.

Compressing some parts of an object more severely compared to the rest of that object;
  Compressing some parts of an object less severely compared to the rest of that object;
  Compressing one object in general more severely compared to the other objects in the scene;
  Compressing one object less severely compared to the other objects in the scene;
  Assigning further/more projections to the same object according to its content. It means that instead of presenting an object with N projections, the object is presented with N+m projections (m>0), targeting more accurately presenting the object and having more flexibility on presenting different parts of the object with different qualities.

In the following, some criteria to determine the degree of compression will be described.

One option is to determine an amount to motion for the content presented by that cylinder and select compression parameters on the basis of how much motion is present in that content. In some situations, the content may be compressed more if there is much motion whereas in some other situations the content may be compressed less if there is plenty of motion. The encoder may evaluate the amount of motion and obtain a certain value which is indicative of the amount of motion and if that value exceeds a certain threshold, the encoder may determine that less compression should be used for that content. In accordance with another embodiment, more than one thresholds are defined wherein different degrees of compression may be utilized with different amounts of motion.

Figure 9A:
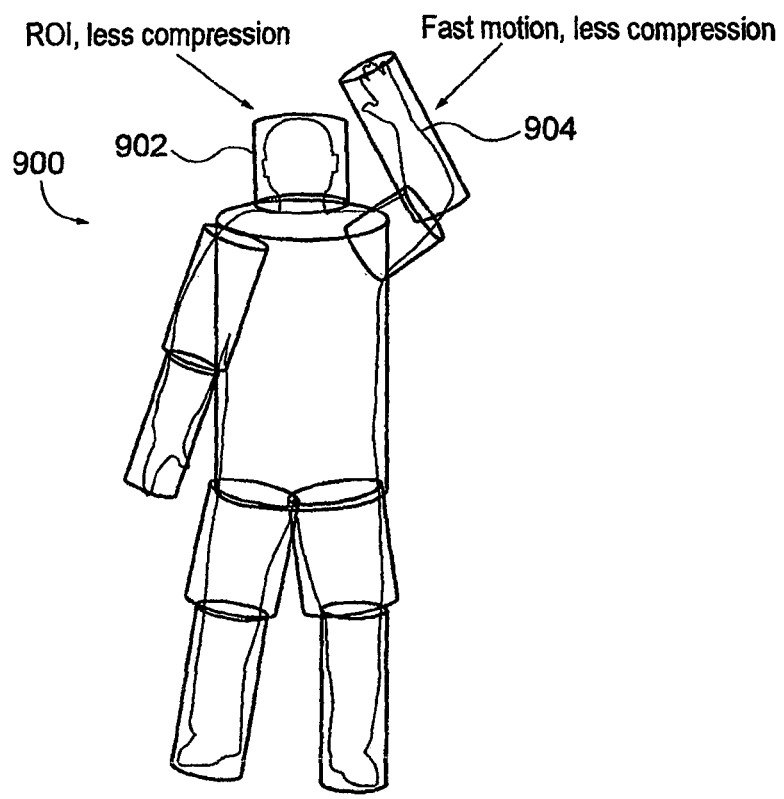
FIGS. 9a and 9b show examples of scenes of volumetric video.

FIG. 9a illustrates an example of an object in a scene of volumetric video. In this example, the face 902 of the person 900 is given a higher priority on the amount of bitrate assigned to it considering that it includes a ROI (face). Moreover, the hand 904 which is waving goodbye has higher motion compared to the rest of the scene, hence, it is compresses less severely compared to the other cylinders.

Figure 9B:
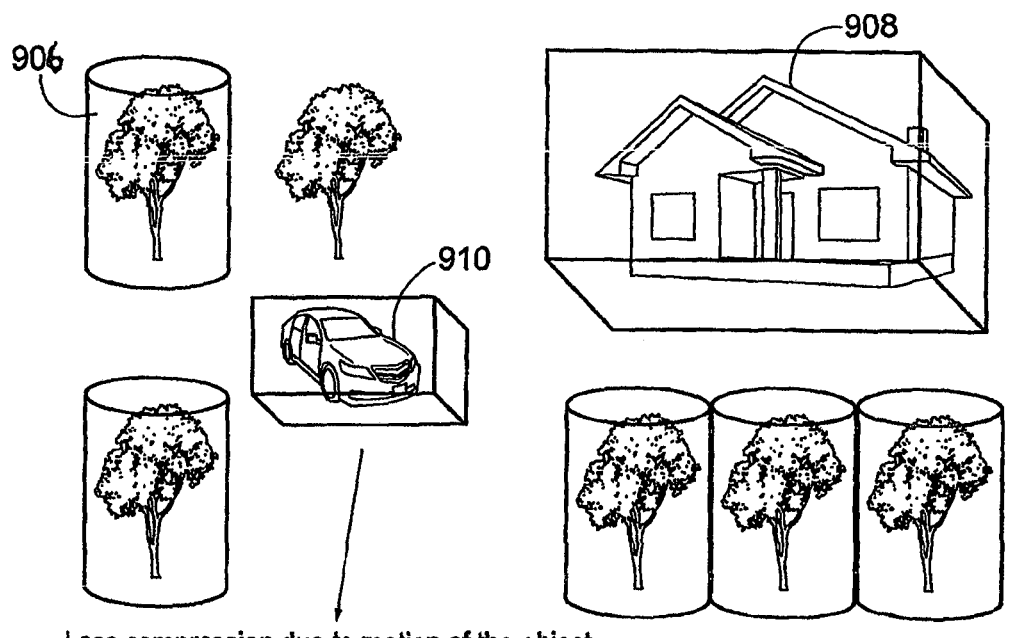

FIG. 9b illustrates another example of a scene of volumetric video. In this figure there are several objects, such as trees 906, a house 908 and a car 910. It is assumed that the car 910 is moving and the other objects are mainly stationary. Due to the movement of the car 910 the projection of the car will be compressed less in this example.

As an example, considering the amount of motion for that part of the object, it is decided whether or not to encode it with a high/low quality. This can be decided to have lower/higher quality, based on the higher motion in the scene. It should be noted that for a part of the scene with higher motion, it can be decided to have higher or lower quality depending on the user/content provider preference, requirement of the respective application, or the content, for example. In other words, some embodiments enable capability of encoding that part of the scene differently from the rest of the scene and does not necessarily define how the quality should be affected. As was mentioned above, in the examples of FIGS. 9a and 9b the higher motion is correlated with less compression applied on that part of the object/scene. However, in a similar approach, the higher motion may also be correlated to higher compression, depending on the user preference, application and/or the content.

Motion respective to scene may be one approach, wherein a 3D object moving within the scene is identified. In an embodiment, the encoding parameters of the respective modalities are set to reflect this motion, e.g. adjusting the frame-rate to match the motion in 3D space, and/or adjust texture compression to reflect motion-blurring.

Motion within 3D object may be another approach, wherein a 3D object with 3D motion is identified, e.g. person waving. In an embodiment, the encoding parameters of the respective modalities are set to reflect this motion, e.g. adjusting the frame-rate (increase for high motion, decrease for slow motion), and/or adjust texture compression to reflect motion-blurring.

Another option to determine the degree of compression is to examine which kind of details a cylinder contains. This may be determined, for example, by examining frequency components of the image information of the cylinder. It can be assumed that the higher the high frequency components, the higher the amount of detail and hence, the higher number of bits should be spent on that part of the scene. This means, a weaker compression to be applied on the content for that part of the scene. In some situations, cylinders including parts of the scene with high frequency components will be compressed less than cylinders including parts of the scene with low frequency components. In some other situations cylinders including parts of the scene with high frequency components will be compressed more than cylinders including parts of the scene with low frequency components. The determination whether a cylinder includes low/high frequency components may be based on one or more reference frequency values (thresholds) wherein if there are components having frequency above a reference frequency value it may be determined that there are high frequency components present and, respectively, if there are no components having frequency above a reference frequency value it may be determined that there are only low frequency components present. It should be noted that the above-mentioned reference frequency value need not be the same in both the above comparison situations. Furthermore, there may be more than one or two reference frequency values and the degree of compression may be the higher (or the lower) the higher frequency components are present in the cylinder (or in another sub-part of the content), and vice versa.

Yet another option is to take into account the distance of the parts of the scene included in the cylinders to the viewer. For example, cylinders having parts which are closer to the viewer may be compressed less than cylinders having parts which are farther to the viewer, or cylinders having parts which are closer to the viewer may be compressed more than cylinders having parts which are farther to the viewer.

In an embodiment, an initial viewing position is given, changes to this position might be updated periodically (e.g. client feedback to MPEG-DASH server). This is a criterion on the distance between that part of the object and the viewer. Considering that the objects and the user are moving in the scene, the distance between different parts of the objects in the scene are changed actively. Hence, in this embodiment, the closer the cylinder to the user, the higher the quality of that object to be. Meaning that if any part of the object is far from the user, the quality of that cylinder may be degraded more compared to the cylinders which are closer to the user. This can be done e.g. by adjusting the encoding parameters of each projection geometry in the 3D scene based on the distance to this viewing position. For example, 2D resolution of projection planes for close objects may be increased and resolution for far objects may be decreased and/or compression quality of respective modalities may be adjusted to reflect the distance to the viewer.

There may also be means for determining or assigning one or more regions of interest (ROI) in a volumetric video. Hence, those cylinders which include content of a region of interest may be compressed less. Such regions may be, for example, faces, written text, screens, a detail of an object, etc. This may help to keep the content of that cylinder with high quality as the ROI is well preserved. The projection geometries for such ROI content can be modified to improve representation, e.g. by dedicated projection geometries for a human head. The encoding parameters of the respective projections can be adjusted to better represent ROI content, e.g. increase 2D resolution of respective projection planes, and/or adjusting compression quality of the 2D projections In accordance with an embodiment, it is possible to manually select or prioritize cylinders e.g. by a user or a content provider, wherein such cylinders can be compressed less that other parts of the volumetric video. In another embodiment, the user or content provider may manually select at least one cylinder to have higher/lower quality as compared to the one automatically pre-selected for it. This means, based on the knowledge of the respective person about the scene/content, they can assign different priorities to different cylinders in the scene and consequently, the quality of them changes according to this assignment. In a higher level of this embodiment, desired level of detail for a 3D object (as compared to part of an object) is defined manually by the content creator before encoding. The encoding parameters of the respective modalities are set to reflect this decision, e.g. increasing/decreasing 2D resolution of respective projection planes, and/or adjusting compression quality of respective modalities to reflect the distance to the viewer.

In the above, several options were presented. As was already mentioned, also other criteria may exist as well. Furthermore, two or more of the above (and possible other criteria) may be used in a combination when determining the degree of compression of different parts of the volumetric video.

In the following, the above listed criteria for determining which kind of compression to use for a cylinder will be described in more detail.

In the above, some criteria for determining which kind of compression to use for a cylinder were listed and some alternatives how to utilize this criteria in encoding of volumetric video.

An improvement in presenting the shape of an object in 3D presentation is to present different parts of its skeleton separately as compared to presenting the whole object with one projection, as was already described above. Such projection enables better and more accurately following the shape of the object. Moreover, if different parts are presented/projected by/to a cylinder, then encoding and definition of such cylinders might be relatively easy by defining the cylinder radius, height and orientation only. However, the accuracy of presenting the object by this method provides considerably higher quality in providing detailed presentation of that object.

Figure 7B:
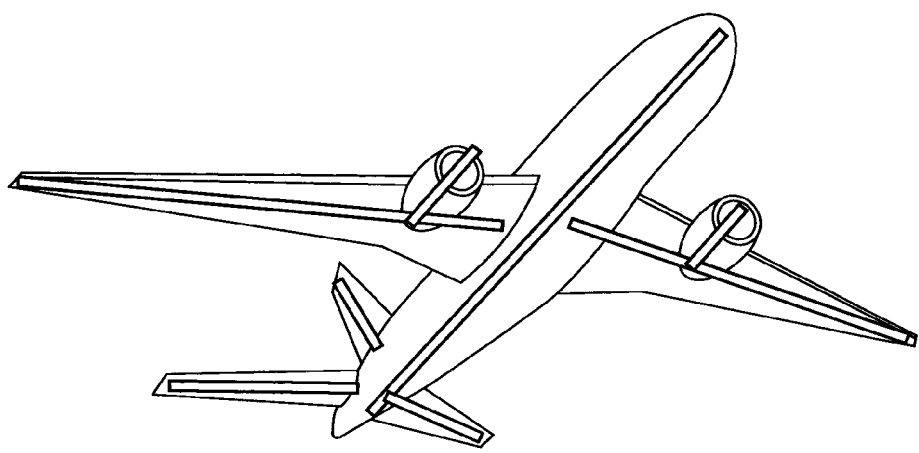
Figure 7C:
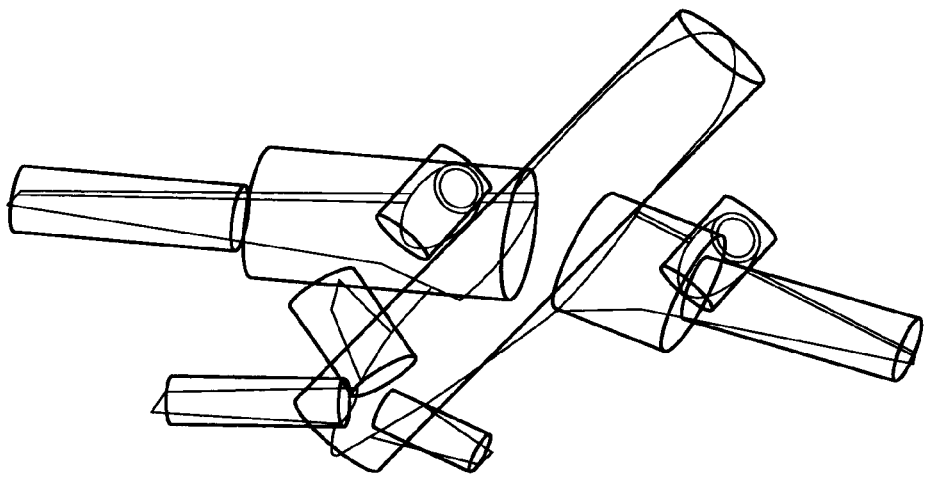

As shown in FIGS. 7b and 7c, different structural skeletons of the objects are projected to a respective cylinder which enables further control on encoding and quality control of that cylinder independently from other cylinders (other parts of the object).

It should be noted that different skeleton parts of the object may not necessarily be projected to a cylindrical volumetric shape but e.g. a cubical or rectangular. In this specification, mostly cylindrical shape is referred to but it should be taken into account that other shapes may also be used.

In another embodiment, a whole object is assigned to have higher (or lower) quality compared to the rest of objects in the scene. This is according to any of the aforementioned criteria to select the respective object which should have higher quality compared to other objects. This is shown in FIG. 9b where the car is encoded with better quality due to its motion.

In yet another embodiment, one or more parts of one object is further projected to a volumetric shape (cylinder or cubic or . . . ) due to having one of the afore-mentioned criteria. For example content provider notices that a wrist and a watch should have a separate projection and should be supported with higher quality compared to the rest of the content, due to ready accuracy required in that area.

It should be noted that it may also be possible to combine two or more of the above-mentioned embodiments.

Figure 8A:
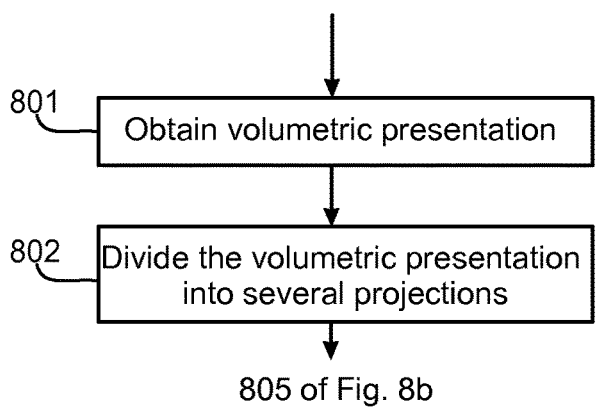
FIGS. 8a, 8b and 8c show flow charts for compressing, encoding and decoding of a scene of a volumetric video.
Figure 8B:
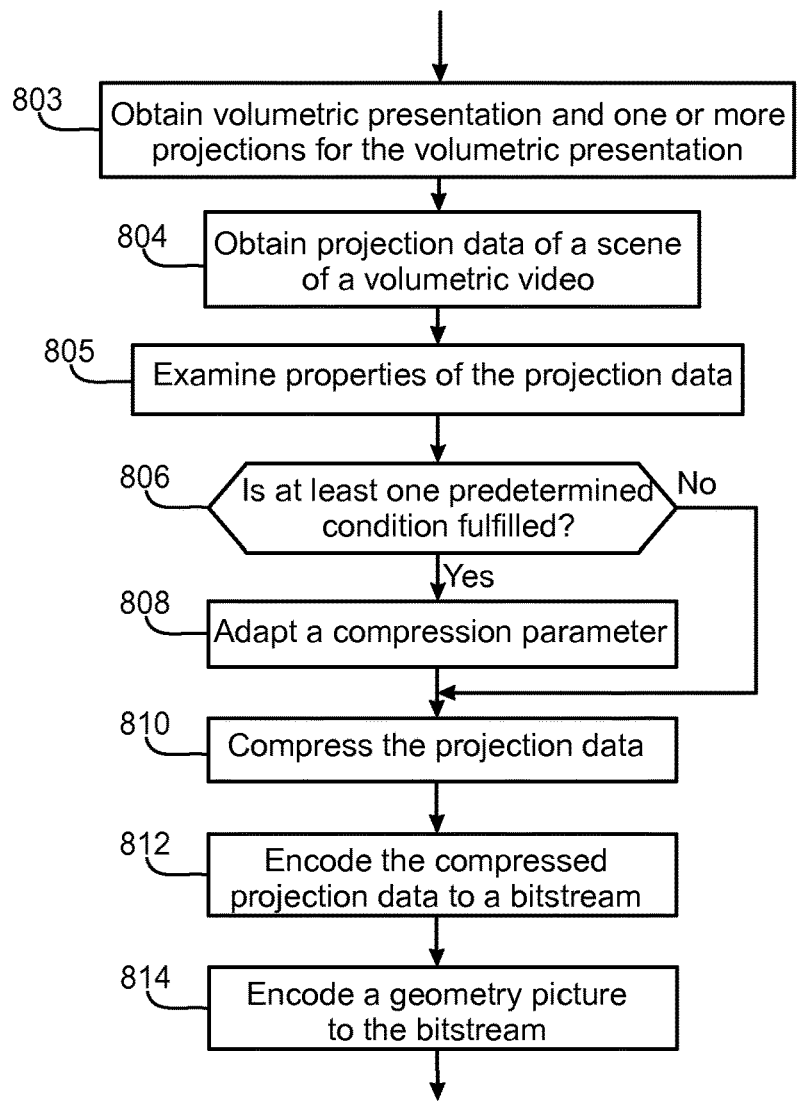
Figure 8C:
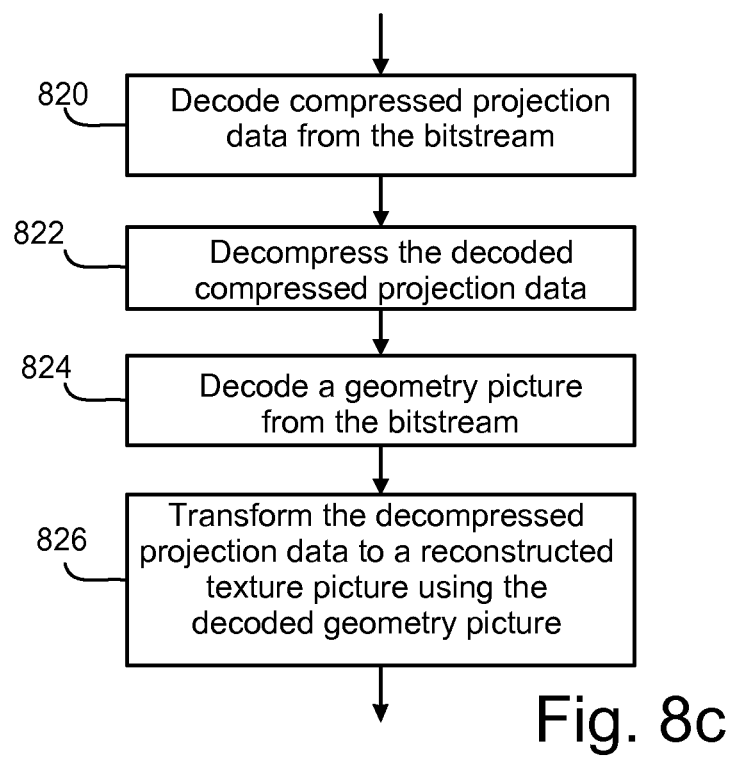

FIGS. 8a, 8b and 8c show flow charts for compressing encoding and decoding of a scene of a volumetric video.

In the encoding, in phase 803 of the flow diagram of FIG. 8b, projection data generated from a projection geometry of an object in a texture picture of volumetric video data is obtained.

In phase 804 projection data of the volumetric video data is obtained.

In phase 805 one or more property of the projection data is examined to determine whether at least one predetermined condition is fulfilled.

In phase 806 the result of the examination is used to determine whether at least one predetermined condition is fulfilled and if so, a compression parameter for the projection data is adapted in phase 808.

In phase 810 the projection data is compressed by using at least the compression parameter to obtain compressed projection data.

In phase 812 the compressed projection data is encoded into the bitstream.

In phase 814 a geometry picture representing geometry data of the texture picture is encoded into the bitstream.

FIG. 8a illustrates an embodiment in which volumetric presentation is obtained in phase 801 and then divided to several (i.e. two or more) projections in phase 802. After the division into several projections the operation continues from step 805 of the flow diagram of FIG. 8b.

In the decoding, in phase 820 the compressed projection data is decoded from the bitstream to obtain decoded compressed projection data.

In phase 822, the decoded compressed projection data is decompressed to obtain reconstructed projection data.

In phase 824, the geometry picture is decoded from the bitstream to obtain decoded geometry picture.

In phase 826, the reconstructed projection data is transferred to a reconstructed texture picture by using the decoded geometry picture.

Figure 10:
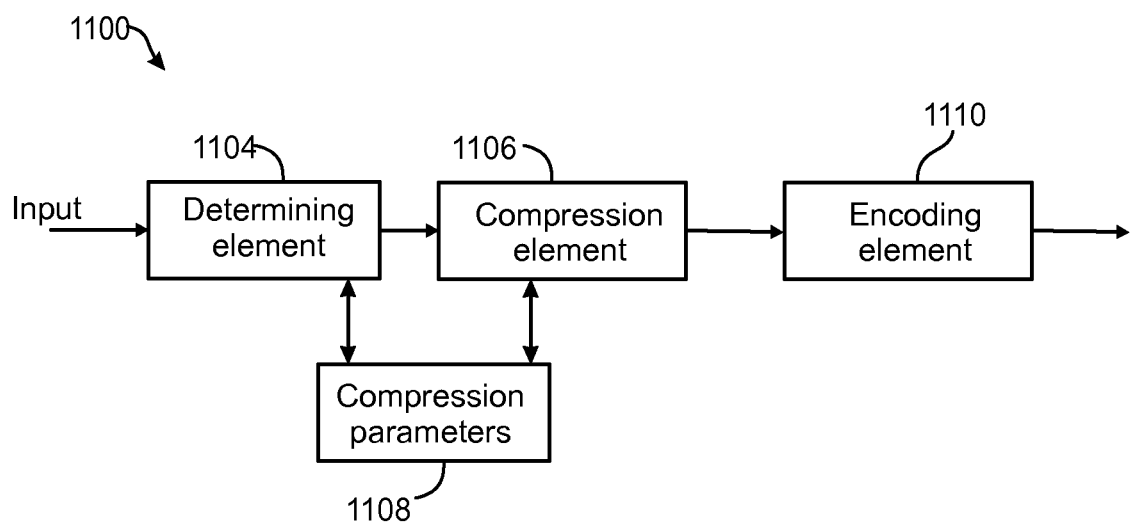
FIG. 10 illustrates an example of an encoding element.

FIG. 10 illustrates an example of an encoding element 1100 which may perform the above described compression operations. Objects of a source volume of a digital scene model may be input 1102 to a determining element 1104 in which different objects may be classified and the degree of compression may be determined for the objects. The objects represent the texture data. Information of the selected degree of compression is provided to a compression element 1106, for example as a set of compression parameters 1108. The compression element 1106 performs the compression of the objects and outputs the compressed data for subsequent encoding e.g. in an encoding element 1110 and transmission.

In the above, some embodiments have been described with reference to encoding. It needs to be understood that said encoding may comprise one or more of the following: encoding source image data into a bitstream, encapsulating the encoded bitstream in a container file and/or in packet(s) or stream(s) of a communication protocol, and announcing or describing the bitstream in a content description, such as the Media Presentation Description (MPD) of ISO/IEC 23009-1 (known as MPEG-DASH) or the IETF Session Description Protocol (SDP). Similarly, some embodiments have been described with reference to decoding. It needs to be understood that said decoding may comprise one or more of the following: decoding image data from a bitstream, decapsulating the bitstream from a container file and/or from packet(s) or stream(s) of a communication protocol, and parsing a content description of the bitstream, In the above, some embodiments have been described with reference to encoding or decoding texture pictures, geometry pictures and projection geometry information into or from a single bitstream. It needs to be understood that embodiments can be similarly realized when encoding or decoding texture pictures, geometry pictures and projection geometry information into or from several bitstreams that are associated with each other, e.g. by metadata in a container file or media presentation description for streaming.

Figure 11:
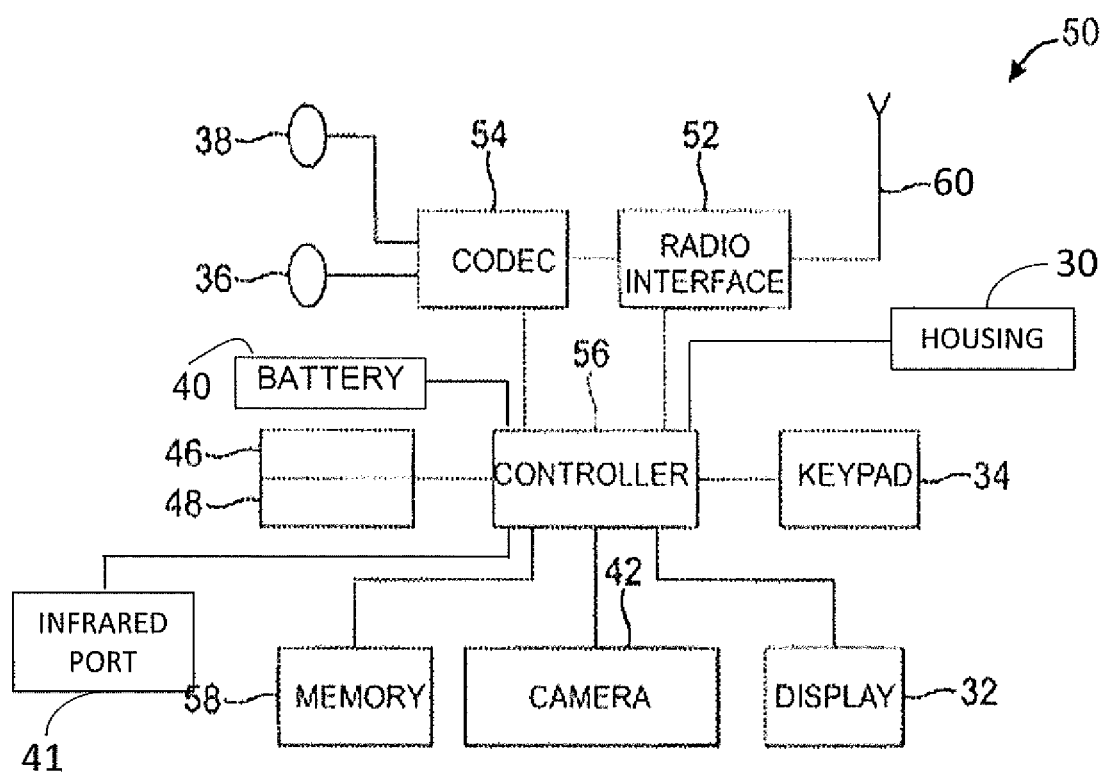
FIGS. 11 and 12 show schematically electronic devices employing embodiments of the examples described herein, with some of the electronic devices being connected using wireless and wired network connections.

The following describes in further detail suitable apparatus and possible mechanisms for implementing the embodiments of the invention. In this regard reference is first made to FIG. 11 which shows a schematic block diagram of an exemplary apparatus or electronic device 50, which may incorporate a transmitter and an antenna 44 according to an embodiment of the invention.

The electronic device 50 may for example be a mobile terminal or user equipment of a wireless communication system. However, it would be appreciated that embodiments of the invention may be implemented within any electronic device or apparatus which may require transmission of radio frequency signals.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The term battery discussed in connection with the embodiments may also be one of these mobile energy devices. Further, the apparatus 50 may comprise a combination of different kinds of energy devices, for example a rechargeable battery and a solar cell. The apparatus may further comprise an infrared port 41 for short range line of sight communication to other devices. In other embodiments the apparatus 50 may further comprise any suitable short range communication solution such as for example a Bluetooth wireless connection or a USB/FireWire wired connection.

The apparatus 50 may comprise a controller 56 or processor for controlling the apparatus 50. The controller 56 may be connected to memory 58 which in embodiments of the invention may store both data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a universal integrated circuit card (UICC) reader and a universal integrated circuit card for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 60 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera 42 capable of recording or detecting imaging.

Figure 12:
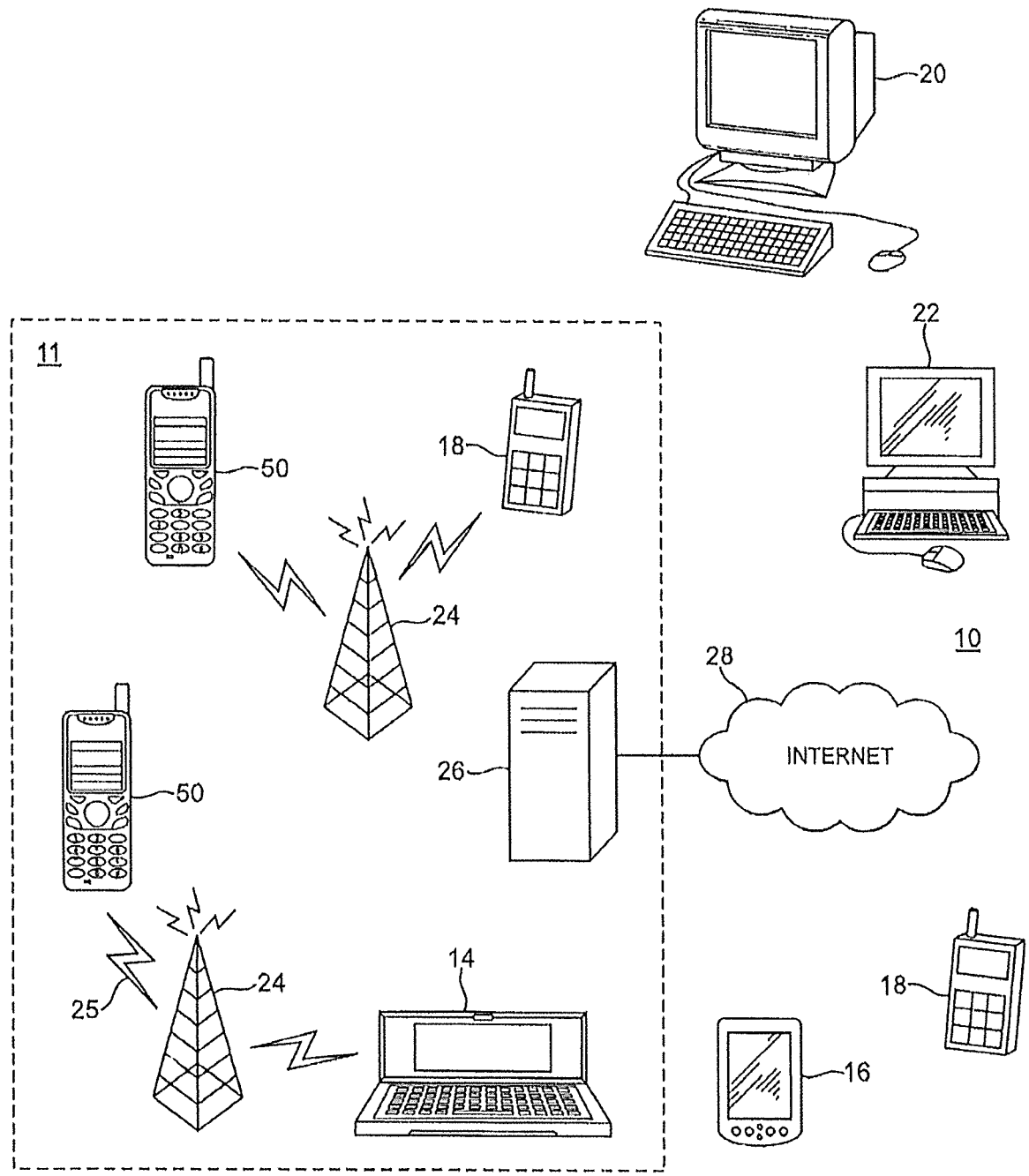

With respect to FIG. 12, an example of a system within which embodiments of the present invention can be utilized is shown. The system 10 comprises multiple communication devices which can communicate through one or more networks. The system 10 may comprise any combination of wired and/or wireless networks including, but not limited to a wireless cellular telephone network (such as a global systems for mobile communications (GSM), universal mobile telecommunications system (UMTS), long term evolution (LTE) based network, code division multiple access (CDMA) network etc.), a wireless local area network (WLAN) such as defined by any of the IEEE 802.x standards, a Bluetooth personal area network, an Ethernet local area network, a token ring local area network, a wide area network, and the Internet.

For example, the system shown in FIG. 12 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a tablet computer. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, Long Term Evolution wireless communication technique (LTE) and any similar wireless communication technology. A communications device involved in implementing various embodiments of the present invention may communicate using various media including, but not limited to, radio, infrared, laser, cable connections, and any suitable connection.

Although the above examples describe embodiments of the invention operating within a wireless communication device, it would be appreciated that the invention as described above may be implemented as a part of any apparatus comprising a circuitry in which radio frequency signals are transmitted and received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
obtaining projection data of a volumetric presentation, the projection data generated from a projection geometry of an object in a texture picture of volumetric video data;
examining at least one property of the projection data to determine whether at least one predetermined condition is fulfilled;
wherein the at least one property comprises a level of detail of the projection data;
in response to the examining revealing that at least one predetermined condition is fulfilled, adapting at least one compression parameter for the projection data;
wherein the at least one compression parameter comprises a number of bits assigned to the projection data;
compressing the projection data based on the at least one adapted compression parameter;
dividing the volumetric presentation into two or more projections, the two or more projections comprising a respective projection geometry;
using the adapted at least one compression parameter in a part of the projection data of the object when the at least one predetermined condition is fulfilled, and using at least one other compression parameter in another part of the projection data of the object when at least one other predetermined condition is fulfilled;
wherein the at least one other compression parameter applies a different degree of compression than the at least one compression parameter; and
signaling, in or along a bitstream, the level of detail of the projection data to a decoder;
wherein the level of detail of the projection data signaled in or along the bitstream to the decoder is configured to be used with the decoder to determine how to reconstruct a three-dimensional position of the projection data from a two-dimensional representation of the projection data using the at least one adapted compression parameter.

2. The method according to claim 1, wherein the at least one predetermined condition comprises an amount of motion of the object being above or below a threshold.

3. The method according to claim 1 further comprising:
assigning more projection geometries to the object depending on a content of the object.

4. The method according to claim 1 further comprising:
adapting the at least one compression parameter for the projection data based on a preference of a content provider or user.

5. The method according to claim 1, further comprising:
unfolding the volumetric video data to obtain the two-dimensional projection data;
wherein the signal that includes the level of detail of the projection data is configured to be used to generate the three-dimensional position following obtaining the two-dimensional projection data.

6. The method according to claim 1, wherein the projection geometry is one of a cylinder projection surface or a cube projection surface.

7. An apparatus comprising at least one processor and at least one non-transitory memory, said at least one memory stored with code thereon, which when executed with said at least one processor, causes the apparatus to perform at least:
obtain projection data of a volumetric presentation, the projection data generated from a projection geometry of an object in a texture picture of volumetric video data;
examine at least one property of the projection data to determine whether at least one predetermined condition is fulfilled;
wherein the at least one property comprises a level of detail of the projection data;
adapt at least one compression parameter for the projection data, in response to the examining revealing that at least one predetermined condition is fulfilled;
wherein the at least one compression parameter comprises a number of bits assigned to the projection data;
compress the projection data based on the at least one adapted compression parameter;
divide the volumetric presentation into two or more projections, the two or more projections comprising a respective projection geometry;
use the adapted at least one compression parameter in a part of the projection data of the object when the at least one predetermined condition is fulfilled, and use at least one other compression parameter in another part of the projection data of the object when at least one other predetermined condition is fulfilled;
wherein the at least one other compression parameter applies a different degree of compression than the at least one compression parameter; and
signal, in or along a bitstream, the level of detail of the projection data to a decoder;
wherein a presence or absence of the level of detail of the projection data signaled in or along the bitstream to the decoder is configured to be used with the decoder to determine how to reconstruct a three-dimensional position of the projection data from a two-dimensional representation of the projection data using the at least one adapted compression parameter.

8. The apparatus according to claim 7, wherein the at least one predetermined condition comprises an amount of high frequency components of the object being above or below a threshold.

9. The apparatus according to claim 7, said at least one memory stored with code thereon, which when executed with said at least one processor, further causes the apparatus to:
assign more projection geometries to the object depending on a content of the object.

10. The apparatus according to claim 7, said at least one memory stored with code thereon, which when executed with said at least one processor, further causes the apparatus to:
adapt the at least one compression parameter for the projection data based on a preference of a content provider or user.

11. The apparatus according to claim 7, said at least one memory stored with code thereon, which when executed with said at least one processor, further causes the apparatus to:
use the adapted at least one compression parameter for the projection data of the object.

12. The apparatus according to claim 7, wherein the projection data is a two-dimensional projection of a three-dimensional object.

13. The apparatus according to claim 7, wherein the projection geometry is one of a cylinder projection surface or a cube projection surface.

14. A non-transitory computer readable storage medium comprising code for use with an apparatus, which when executed with a processor, causes the apparatus to perform at least:
obtain projection data of a volumetric presentation generated from a projection geometry of an object in a texture picture of volumetric video data;
examine at least one property of the projection data to determine whether at least one predetermined condition is fulfilled;
wherein the at least one property comprises a level of detail of the projection data;
adapt at least one compression parameter for the projection data, in response to the examining revealing that at least one predetermined condition is fulfilled;
wherein the at least one compression parameter comprises a number of bits assigned to the projection data;
compress the projection data based on the at least one adapted compression parameter;
divide the volumetric presentation into two or more projections, the two or more projections comprising a respective projection geometry;
use the adapted at least one compression parameter in a part of the projection data of the object when the at least one predetermined condition is fulfilled, and use at least one other compression parameter in another part of the projection data of the object when at least one other predetermined condition is fulfilled;
wherein the at least one other compression parameter applies a different degree of compression than the at least one compression parameter; and
signal, in or along a bitstream, the level of detail of the projection data to a decoder;
wherein a presence or absence of the level of detail of the projection data signaled in or along the bitstream to the decoder is configured to be used with the decoder to determine how to reconstruct a three-dimensional position of the projection data from a two-dimensional representation of the projection data using the at least one adapted compression parameter.

15. The computer readable storage medium according to claim 14, wherein the at least one predetermined condition comprises one or more of the following:
an amount of motion of the object being above or below a first threshold;

an amount of high frequency components of the object being above or below a second threshold;
a distance of an object from a viewing point being above or below a third threshold;
whether the object is within a region of interest; or
a selected object.

16. The computer readable storage medium comprising code according to claim 14, which when executed with said at least one processor, further causes the apparatus to:
assign more projection geometries to the object depending on a content of the object.

17. The computer readable storage medium comprising code according to claim 14, which when executed with said at least one processor, further causes the apparatus to:
receive a content provider preference; and
adapt the at least one compression parameter based on the received content provider preference.

* * * * *